(12) United States Patent
Miyazato et al.

(10) Patent No.: US 12,427,512 B2
(45) Date of Patent: Sep. 30, 2025

(54) PIPETTE

(71) Applicant: KYOCERA CORPORATION, Kyoto (JP)

(72) Inventors: Kentarou Miyazato, Kirishima (JP); Tsutomu Sugawara, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 722 days.

(21) Appl. No.: 17/638,854

(22) PCT Filed: Sep. 1, 2020

(86) PCT No.: PCT/JP2020/033054
§ 371 (c)(1),
(2) Date: Feb. 28, 2022

(87) PCT Pub. No.: WO2021/045043
PCT Pub. Date: Mar. 11, 2021

(65) Prior Publication Data
US 2022/0288579 A1 Sep. 15, 2022

(30) Foreign Application Priority Data
Sep. 3, 2019 (JP) .................. 2019-160014

(51) Int. Cl.
*B01L 3/02* (2006.01)
*G01N 35/10* (2006.01)

(52) U.S. Cl.
CPC .......... *B01L 3/021* (2013.01); *G01N 35/1009* (2013.01); *B01L 2200/026* (2013.01);
(Continued)

(58) Field of Classification Search
None
See application file for complete search history.

(56) References Cited

U.S. PATENT DOCUMENTS

| 5,465,629 | A | 11/1995 | Waylett, Jr. |
| 5,773,305 | A | 6/1998 | Zabetakis et al. |

(Continued)

FOREIGN PATENT DOCUMENTS

| CN | 109937365 A | 6/2019 |
| EP | 1027932 A2 | 8/2000 |

(Continued)

OTHER PUBLICATIONS

JP200402893 A English Translation (Year: 2004).*

*Primary Examiner* — Elizabeth A Robinson
*Assistant Examiner* — Brittany I Fisher
(74) *Attorney, Agent, or Firm* — HAUPTMAN HAM, LLP

(57) ABSTRACT

A pipette includes a capillary, a pressure chamber, a drive unit, and a control unit. The capillary has a first end and a second end that are two ends in a length direction and that are open. The pressure chamber communicates with an inside of the capillary via the second end. The drive unit changes a volume of the pressure chamber. The control unit controls the drive unit. The control unit outputs a vibrational movement signal that drives the drive unit so that a liquid moves from a mid-position in the capillary to a finish position that is located closer to the second end than the mid-position. The vibrational movement signal has a waveform that drives the drive unit so that the volume of the pressure chamber alternately increases and decreases repeatedly.

8 Claims, 9 Drawing Sheets

(52) U.S. Cl.
CPC ............... *B01L 2200/0605* (2013.01); *B01L 2300/0838* (2013.01); *B01L 2300/14* (2013.01); *B01L 2400/0487* (2013.01); *G01N 2035/1027* (2013.01)

(56) References Cited

U.S. PATENT DOCUMENTS

| | | | |
|---|---|---|---|
| 6,551,557 B1 * | 4/2003 | Rose | B01L 3/0244 73/864.31 |
| 2002/0011276 A1 | 1/2002 | Sander | |
| 2003/0215957 A1 * | 11/2003 | Lemmo | G01N 35/1016 436/180 |
| 2008/0309274 A1 * | 12/2008 | Thomson | H02P 8/14 318/567 |
| 2016/0074882 A1 * | 3/2016 | Büstgens | B05B 12/088 239/533.13 |
| 2019/0321815 A1 | 10/2019 | Schmid | |
| 2021/0373044 A1 | 12/2021 | Miyazato | |

FOREIGN PATENT DOCUMENTS

| | | | |
|---|---|---|---|
| JP | S60189332 U | | 12/1985 |
| JP | H5184949 A | | 7/1993 |
| JP | H616852 U | | 3/1994 |
| JP | H1062437 A | | 3/1998 |
| JP | 2000304754 A | | 11/2000 |
| JP | 200218800 A | | 1/2002 |
| JP | 2004202893 A | * | 7/2004 |
| WO | 9325914 A1 | | 12/1993 |
| WO | 2020050235 A1 | | 3/2020 |

* cited by examiner

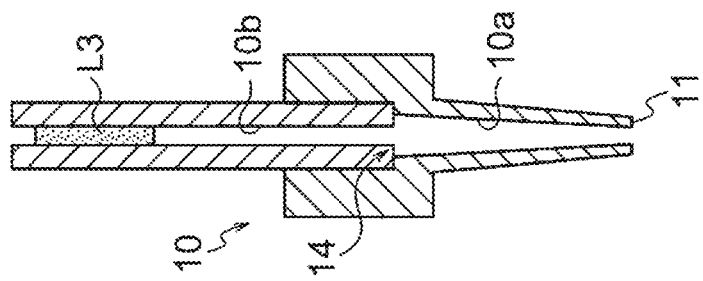
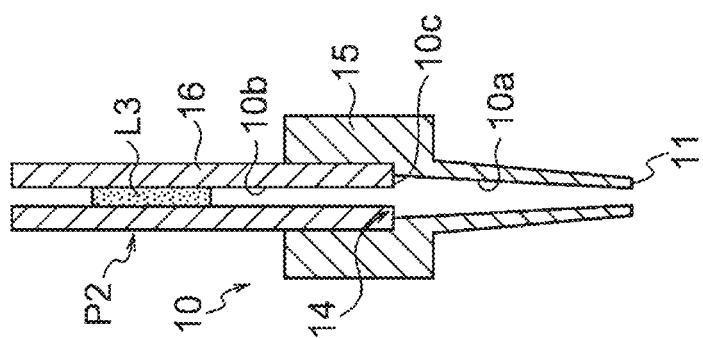
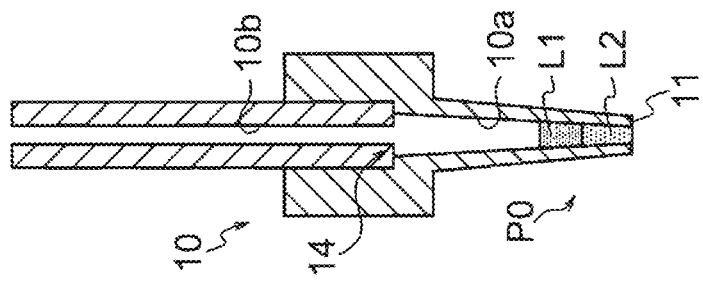
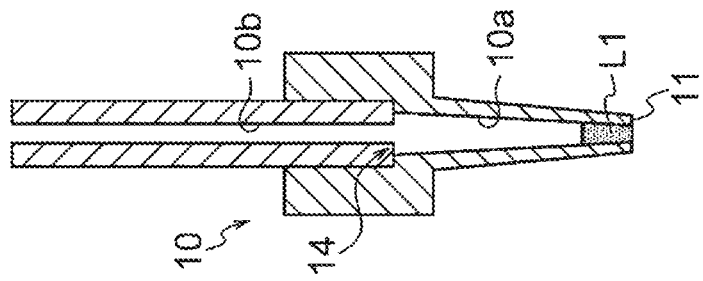

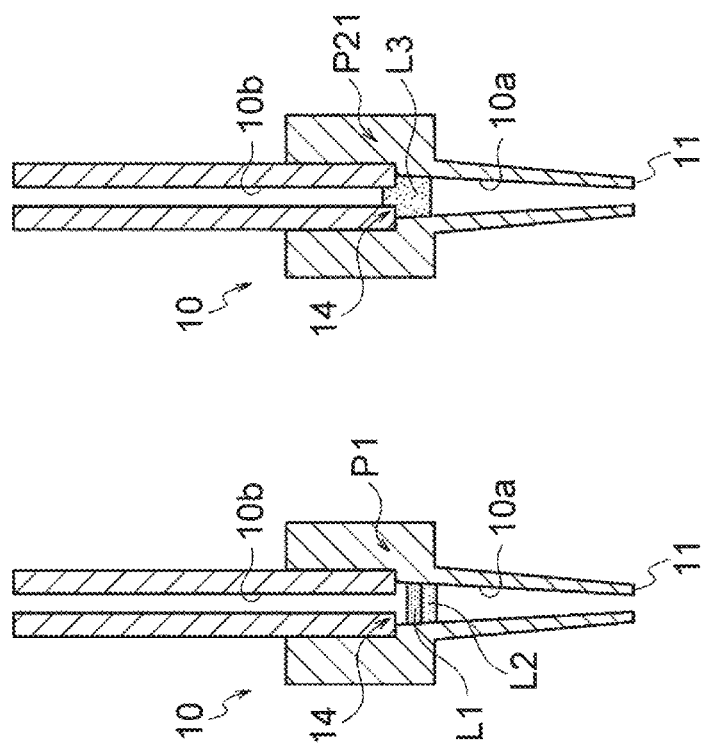

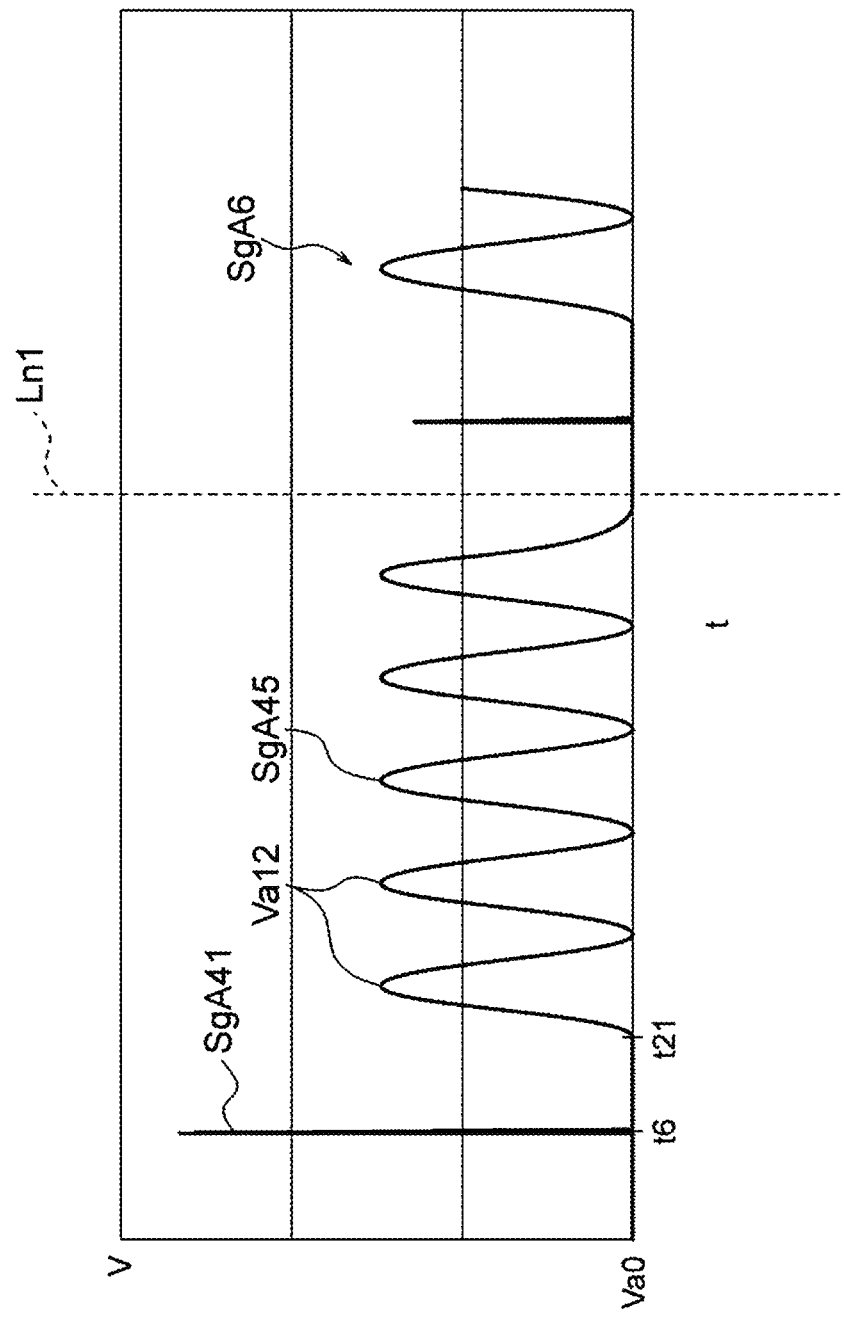

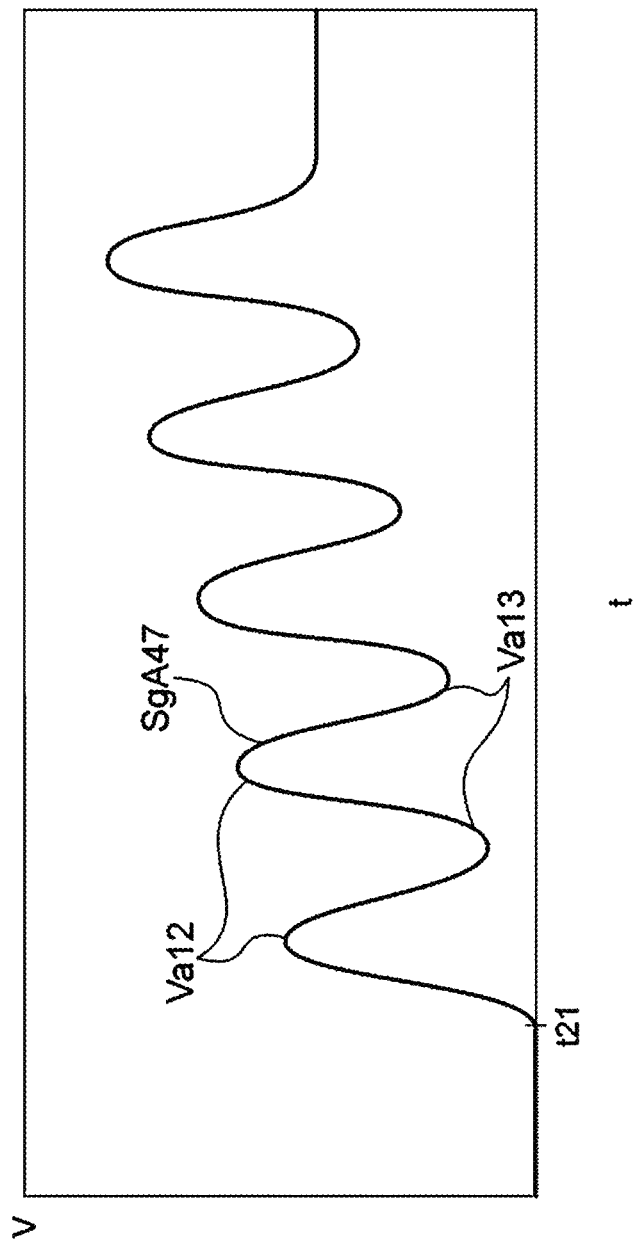

PIPETTE

RELATED APPLICATIONS

The present application is a National Phase of International Application No. PCT/JP2020/033054, filed Sep. 1, 2020, which claims priority to Japanese Application No. 2019-160014, filed Sep. 3, 2019.

TECHNICAL FIELD

The present disclosure relates to a pipette.

BACKGROUND ART

A pipette that drives a pump-action device to generate a negative pressure in a capillary to suck a liquid into the capillary is known (for example, PTLs 1 and 2). PTLs 1 and 2 describe an operation that, after sucking liquids of a plurality of types, stirs and mixes the liquids by causing the liquids inside the capillary to reciprocate in the length direction of the capillary.

CITATION LIST

Patent Literature

PTL 1: Japanese Unexamined Patent Application Publication No. 10-62437
PTL 2: Japanese Unexamined Patent Application Publication No. 2000-304754

SUMMARY OF INVENTION

A pipette according to an aspect of the present disclosure includes a capillary, a pressure chamber, a drive unit, and a control unit. The capillary has a first end and a second end that are two ends in a length direction and that are open. The pressure chamber communicates with an inside of the capillary via the second end. The drive unit changes a volume of the pressure chamber. The control unit controls the drive unit. The control unit outputs a first movement signal that drives the drive unit so that a liquid moves from a predetermined first position in the capillary to a second position that is located closer to the second end than the first position. The first movement signal has a waveform that drives the drive unit so that the volume of the pressure chamber alternately increases and decreases repeatedly.

BRIEF DESCRIPTION OF DRAWINGS

FIGS. 4A to 4D schematically illustrate an overview of an action due to the signals of FIG. 3.
FIGS. 6A to 6D schematically illustrate an overview of an action due to the signal of FIG. 5.
FIG. 8 is a graph schematically illustrating the waveform of a signal according to a first modification.
FIG. 9 is a graph schematically illustrating the waveform of a signal according to a second modification.

DESCRIPTION OF EMBODIMENTS

Figure 1:
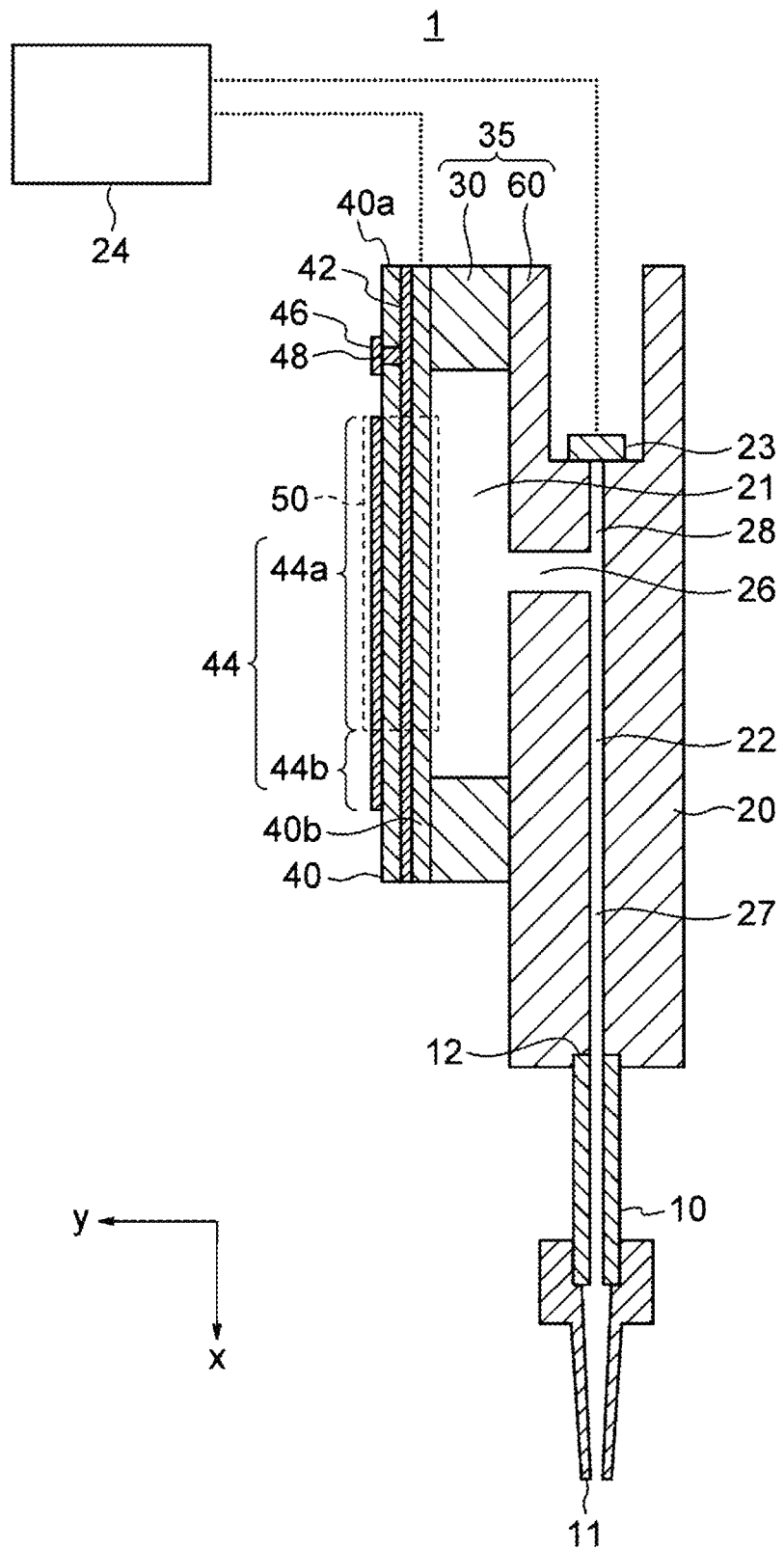
FIG. 1 is a sectional view schematically illustrating a specific example of a pipette according to the present disclosure.

Hereafter, an embodiment of the present disclosure will be described with reference to the drawings. The drawings used in the following description are schematic, and dimensional ratios and the like in the drawings do not necessarily coincide with actual ones. Between different drawings, dimensional ratios and the like do not necessarily coincide with each other.

In the present disclosure, the term such as "water repellency" or "hydrophilicity" may be used for either of absolute evaluation and relative evaluation of characteristics.

For example, "has water repellency" means that the contact angle of a liquid to be sucked by a pipette is greater than or equal to 90° (absolute evaluation). For example, "has hydrophilicity" means that the contact angle of a liquid to be sucked by a pipette is less than 90°. When a liquid to be sucked by a pipette is not specified, water repellency or hydrophilicity may be determined by using the contact angle of water.

On the other hand, for example, "has a higher water repellency", "has a lower water repellency", or "has a different water repellency" respectively mean that, when the contact angles of a liquid to be sucked by a pipette (which may be water, as described above) are compared between two members that are in contact with the liquid, one of the contact angles is greater than, less than, or differ from the other contact angle (relative evaluation). Accordingly, for example, when it is described that a first member has a water repellency higher than that of a second member, both of the first member and the second member need not have water repellency, or the second member need not have water repellency and may have hydrophilicity.

[Overview of Pipette]

FIG. 1 is a sectional view schematically illustrating the configuration of a pipette 1 according to an embodiment of the present disclosure. In the figure, for convenience, an orthogonal coordinate system xy, which is fixed with respect to the pipette 1, is attached. The +x side (downward along the plane of the figure) is the downward direction when a liquid is sucked by using the pipette 1.

The pipette 1 includes, for example, a capillary 10, a pipette body 20 that changes the pressure of a gas in the capillary 10, and a control unit 24 that controls the operation of the pipette body 20. In FIG. 1, structural parts of the capillary 10 and the pipette body 20 are illustrated by a schematic sectional view. The control unit 24 of the pipette body 20 is illustrated by a block diagram.

With the pipette 1, for example, a liquid is sucked into the capillary 10 from a front end (a first end 11) of the capillary 10 on the +x side as a gas in the capillary 10 is discharged by the pipette body 20 from a back end (a second end 12) of the capillary 10 in a state in which the first end 11 is in contact with the liquid. From another viewpoint, the liquid moves in a direction from the first end 11 toward the second end 12. Conversely, the liquid moves in a direction from the second end 12 toward the first end 11 as a gas is supplied by the pipette body 20 into the capillary 10 from the second end 12.

[Capillary (Overview)]

The capillary 10 has a tubular shape having the first end 11 and the second end 12 that are two ends in the length direction (x direction) and that are open. The "tubular shape" means, for example, a shape that is long in one direction (the length in the one direction is greater than the length in any other direction), that is hollow, and whose two ends are open; and does not mean only a cylindrical shape.

The schematic shape of the capillary 10 may be any appropriate shape. For example, in a cross section of the capillary 10 (a section perpendicular to the length direction, the same applies hereafter), the shape of the inner edge (the inner surface of the capillary 10) and/or the outer edge (the outer surface of the capillary 10) each may be a circle, an ellipse, an oval, a polygon, or the like. For example, the shape and/or the size of the cross section (the inner edge and/or the outer edge) may be uniform over the entire length of the capillary 10, or may differ depending on the position in the longitudinal direction in at least a part of the entire length of the capillary 10. For example, in the cross section of the capillary 10, the inner edge and the outer edge may have shapes that are similar to each other or may have shapes that are not similar to each other. For example, the center line of the inner space (flow path) of the capillary 10 may extend linearly from the first end 11 to the second end 12, or may be curved or bent in at least a part thereof.

In the description of the present embodiment, for convenience, it is assumed that the cross section (the inner edge and the outer edge) of the capillary 10 is a circle at any position in the length direction. In this case, the shapes of cross sections of a hole in the capillary 10 at positions that differ from each other in the length direction of the capillary 10 are the same as or similar (including congruent) to each other. When it is described that the inside diameters at positions that differ from each other in the length direction of the capillary 10 differ from each other, it may be interpreted that the areas of cross sections differ from each other in either of a configuration in which the shapes of the cross sections of the hole are similar to each other and in a configuration in which the shapes of the cross sections are not similar to each other.

The dimensions of the capillary 10 may be set in any appropriate manner in accordance with various factors such as the amount of a liquid to be sampled and/or the method of attaching the capillary 10 to the pipette body 20. For example, the inside diameter of the capillary 10 may be greater than or equal to 0.06 mm and less than or equal to 0.3 mm. For example, the outside diameter of the capillary 10 may be greater than or equal to 0.12 mm and less than or equal to 1.2 mm. For example, the length of the capillary 10 may be greater than or equal to 20 mm and less than or equal to 100 mm.

The material of the capillary 10 may be any appropriate material. For example, examples of the material include glass, a resin, ceramics, and a metal. Examples of the resin include polypropylene, polyethylene, and polytetrafluoroethylene. For example, a part and another part of the capillary 10 in the length direction may be made of materials that differ from each other, and/or a part and another part of the capillary 10 in the radial direction may be made of materials that differ from each other. Conversely, substantially all of the capillary 10 may be integrally formed from the same material. For example, the capillary 10 may be formed by forming, on at least a part of the surface of a member made of one material, a film made of another material. For example, at least a part (that is, a part or all) of the capillary 10 may be made of a material (such as a resin or glass) having light transmittance.

At least a part (that is, a part or all) of the surface of the capillary 10 may have water repellency. A region of the surface of the capillary 10 having water repellency may be set in any appropriate manner. For example, the region having water repellency includes an end surface of the first end 11 (a surface facing in the +x direction), a part of the inner surface of the capillary 10 on the +x side, and a part of the outer surface of the capillary 10 on the +x side. In other words, the region having water repellency includes a region that comes into contact with a liquid. Because the region that comes into contact with the liquid has water repellency, for example, the probability of the occurrence of unintended adhesion and/or movement of the liquid is reduced, and the accuracy in the amount of sampled liquid is improved.

The capillary 10 (a part or all thereof) may, for example, have water repellency at the surface thereof by being made of a material having water repellency. For example, the capillary 10 (a part or all thereof) may have water repellency at the surface thereof by having a water repellent film formed on a surface of a member that is made of a material that does not have water repellency.

As the water repellent film, any appropriate film may be used. Examples of the water repellent film include a water repellent film formed of a silane coupling agent, a metal-alkoxide-containing water repellent film, a silicone-containing water repellent film, and a fluorocarbon-resin-containing water repellent film. As a method of forming the water repellent film on the surface of the capillary 10, any appropriate method may be used, and, for example, a dry process method may be used or a wet process method may be used. Examples of the dry process method include physical gas-phase deposition and chemical gas-phase deposition. Examples of the former include physical vapor deposition and sputtering. Examples of the latter include chemical vapor deposition (CVD) and atomic layer deposition (ALD). Examples of the wet process method include a sol-gel method, a dip-coating method, and an application method.

The capillary 10 is, for example, disposable, and is attachable to and removable from the pipette body 20. The method of attaching and removing the capillary 10 may be any appropriate method. For example, the capillary 10 may be fixed by being pressed into the hole in the pipette body 20, or may be fixed by being tightened or engaged by a mechanism (not illustrated) provided in the pipette body 20. However, the capillary 10 may be repeatedly used, or may be irremovably fixed (for example, bonded) to the pipette body 20.

[Pipette Body]

The pipette body 20 has a pressure chamber 21 (cavity) that communicates with the inside of the capillary 10. The pipette body 20 reduces the pressure of (discharges a gas from) the inside of the capillary 10 by increasing the volume of the pressure chamber 21, and increases the pressure of (supplies air to) the inside of the capillary 10 by reducing the volume of the pressure chamber 21. Thus, for example, suction, discharge, and the like of a liquid by the capillary 10 are realized. The pipette body 20, which realizes such operations, may have any appropriate configuration. An example of the configuration is as follows.

The pipette body 20 includes, for example, a flow path member 35 that forms a flow path (including the pressure chamber 21) that communicates with the inside of the capillary 10, an actuator 40 that changes the volume of the pressure chamber 21, and a valve 23 that permits or prohibits flow of a gas between the inside (flow path) and the outside of the flow path member 35.

(Flow Path Member)

The general outer shape and size of the flow path member 35 may be any appropriate shape. In the illustrated example, the general outer shape of the flow path member 35 may be a shaft-like shape (a shape such that the length in the x direction is greater than the length in any other direction) that is serial to the capillary 10. The size is, for example, a size that a user can hold between fingers or grip (for example, with a maximum outside diameter of less than or equal to 50 mm).

The inner space of the flow path member 35 includes, for example, the pressure chamber 21 described above, a communication flow path 27 that connects the capillary 10 and the pressure chamber 21, and an open flow path 28 that connects the communication flow path 27 (from another viewpoint, the pressure chamber 21) and the outside.

The shape, position, size, and the like of the pressure chamber 21 may be set in any appropriate manner. In the illustrated example, the pressure chamber 21 is located in a side surface of the flow path member 35. For example, the general shape of the pressure chamber 21 may be a thin shape that has a thickness direction (y direction) in which the pressure chamber 21 overlaps the actuator 40 and that has a substantially uniform thickness. Here, the thin shape is a shape such that the length in the y direction is less than the maximum length in any direction perpendicular to the y direction. The planar shape of the pressure chamber 21 (shape as seen in the y direction) may be any appropriate shape, such as a circle, an ellipse, a rectangle, a rhombus, or the like. The thickness of the pressure chamber 21 (y direction) is, for example, greater than or equal to 50 μm and less than or equal to 5 mm. The diameter of the pressure chamber 21 (the maximum length in any direction perpendicular to the y direction) is, for example, greater than or equal to 2 mm and less than or equal to 50 mm.

The shapes, positions, sizes, and the like of the communication flow path 27 and the open flow path 28 may be set in any appropriate manner. For example, the flow path member 35 includes a first flow path 22, which extends from the capillary 10 in the length direction of the capillary 10 (the x direction), and a second flow path 26, which extends from a middle part of the first flow path 22 to the pressure chamber 21 in a direction that intersects the first flow path 22. The communication flow path 27 is constituted by the second flow path 26 and a part of the first flow path 22 on the capillary 10 side from a connection position with the second flow path 26. With such a flow path configuration, for example, the probability of entry of a sucked liquid (for example, splashes thereof) into the pressure chamber 21 and adhesion of the liquid to the actuator 40 is reduced. As a result, the probability of change in the operation characteristics of the actuator 40 due to adhering liquid is reduced.

The first flow path 22 communicates, for example, with the outside of the flow path member 35 on a side opposite to the capillary 10. The open flow path 28 is formed of a part of the first flow path 22 on the side opposite to the capillary 10 from the connection position with the second flow path 26. Accordingly, space utility is improved because a flow path for draining a liquid so that the liquid may not enter the pressure chamber 21 also serves as the open flow path 28 for opening the pressure chamber 21 to the outside.

The dimensions and shapes of the cross sections of the first flow path 22 and the second flow path 26 may be set in any appropriate manner. For example, the cross sections of the first flow path 22 and the second flow path 26 are each a circle having a diameter that is greater than or equal to 0.1 mm and less than or equal to 1 mm. The inside diameters of the first flow path 22 and the second flow path 26 may be the same as each other or may be different from each other. The shapes and sizes of the cross sections of the first flow path 22 and/or the second flow path 26 each may be uniform or may vary in the length direction.

The flow path member 35 may be composed of members made of any appropriate materials and having any appropriate shapes. In the illustrated example, the flow path member 35 includes a first part 30 and a second part 60 that are joined to each other. The first part 30 has a through-hole that serves as the pressure chamber 21. The second part 60 has the first flow path 22 and the second flow path 26. The pressure chamber 21 is formed of a space surrounded by the first part 30, the second part 60, and the actuator 40. The first part 30 and the second part 60 each may be formed of a combination of a plurality of members. The materials of the first part 30 and the second part 60 each may be, for example, a metal, ceramics, or a resin, or any combination of these.

(Actuator)

The actuator 40 forms, for example, one of inner surfaces of the pressure chamber 21. To be specific, for example, the actuator 40 has a substantially plate-like shape, is joined to the first part 30 so as to close the through-hole of the first part 30 from a side opposite to the second part 60, and forms an inner surface on a side opposite to an inner surface in which the communication flow path 27 opens. The actuator 40 reduces the volume of the pressure chamber 21 by bending toward the pressure chamber 21 (in other words, by inwardly displacing an inner surface of the pressure chamber 21). Conversely, the actuator 40 increases the volume of the pressure chamber 21 by bending toward a side opposite to the pressure chamber 21 (in other words, by outwardly displacing the inner surface of the pressure chamber 21).

The specific configuration of the actuator 40, which causes bending deformation as described above, may be any appropriate one. For example, the actuator 40 is formed of a unimorph piezoelectric element. To be more specific, for example, the actuator 40 includes two piezoelectric ceramic layers 40a and 40b that are stacked. The actuator 40 includes an inner electrode 42 and a surface electrode 44 that face each other with the piezoelectric ceramic layer 40a therebetween. The piezoelectric ceramic layer 40a is polarized in the thickness direction.

When a voltage is applied to the piezoelectric ceramic layer 40a via the inner electrode 42 and the surface electrode 44 in the same direction as the polarization direction, the piezoelectric ceramic layer 40a contracts in the in-plane direction. On the other hand, the piezoelectric ceramic layer 40b does not contract in such a manner. As a result, the piezoelectric ceramic layer 40a bends toward the piezoelectric ceramic layer 40b. That is, the actuator 40 bends toward the pressure chamber 21. When a voltage opposite to the aforementioned voltage is applied, the actuator 40 bends toward a side opposite to the pressure chamber 21.

The shape, size, and the like of the actuator 40 may be set in any appropriate manner. For example, the actuator 40 has an appropriate flat-plate-like planar shape. The planar shape may be similar to the planer shape of the pressure chamber 21 or need not be similar to the planer shape of the pressure chamber 21. The maximum length in any direction in plan view (as seen in the y direction) is, for example, greater than or equal to 3 mm and less than or equal to 100 mm. The thickness of the actuator 40 (in the y direction) is, for example, greater than or equal to 20 μm and less than or equal to 2 mm. The materials, dimensions, shapes, electrical conduction methods, and the like of various members of the actuator 40 may be set in any appropriate manner. Examples of these are as follows.

The thicknesses of the piezoelectric ceramic layers 40*a* and 40*b* each may be, for example, greater than or equal to 10 μm and less than or equal to 30 μm. The materials of the piezoelectric ceramic layers 40*a* and 40*b* each may be, for example, a ceramic material having ferroelectricity. Examples of the ceramic material include a lead zirconate titanate (PZT)-based material, a $NaNbO_3$-based material, a $KNaNbO_3$-based material, $BaTiO_3$-based material, (BiNa)$NbO_3$-based material, and $BiNaNb_5O_{15}$-based material. The piezoelectric ceramic layer 40*b* may be made of a material other than a piezoelectric substance.

The inner electrode 42 is located, for example, between the piezoelectric ceramic layer 40*a* and the piezoelectric ceramic layer 40*b*, and has substantially the same size as the actuator 40. The thickness of the inner electrode 42 is, for example, greater than or equal to 1 μm and less than or equal to 3 μm. The inner electrode 42 can conduct electrically from the outside, for example, via a through electrode 48, which extends through the piezoelectric ceramic layer 40*a*, and a connection electrode 46, which is located on the surface of the actuator 40 and is connected to the through electrode 48.

The surface electrode 44 is located, for example, on a side of the piezoelectric ceramic layer 40*a* opposite to the piezoelectric ceramic layer 40*b* (outside relative to the pressure chamber 21), and includes a surface electrode body 44*a* and an extension electrode 44*b*. The surface electrode body 44*a* has, for example, substantially the same planar shape as the pressure chamber 21, and is disposed so as to overlap the pressure chamber 21 in the thickness direction. The extension electrode 44*b* is formed so as to be extended from the surface electrode body 44*a*. The thickness of the surface electrode 44 may be, for example, greater than or equal to 0.1 μm and less than or equal to 1 μm.

The material of each of the inner electrode 42, the surface electrode 44, the connection electrode 46 and the through electrode 48 may be, for example, a metal material. To be more specific, for example, the material of each of the inner electrode 42 and the through electrode 48 may be silver-palladium (Ag—Pd). The material of each of the surface electrode 44 and the connection electrode 46 may be, for example, gold (Au).

The actuator 40 or a part of the actuator 40 (for example, a part that overlaps the surface electrode body 44*a*) may be referred to as a "drive unit 50". The actuator 40 is not limited to a unimorph piezoelectric element. For example, the actuator 40 may be a bimorph piezoelectric element or may be an electrostatic actuator.

(Valve)

The valve 23 is disposed, for example, at a position at which the open flow path 28 communicates with the outside. When the valve 23 is opened or closed, flow of a gas between the inside and the outside of the flow path member 35 is permitted or prohibited. In a state in which flow of a gas is prohibited, the pressure of the inside of the capillary 10 is reduced and increased when the volume of the pressure chamber 21 changes. On the other hand, in a state in which flow of a gas is permitted, the pressure of the inside of the capillary 10 is not reduced and increased even when the volume of the pressure chamber 21 changes. A use example of this action, with which the pressure is not reduced or increased, will be described below.

The valve 23, for example, opens and closes in response to a signal that is input from the outside. As the valve 23, any appropriate valve, such as an electromagnetic valve or a piezoelectric valve, can be used. The valve 23 may be any of the following types: a type that closes when a signal is not input and that opens when a signal is input; a type that opens when a signal is not input and that closes when a signal is input; and a type to which each of a signal for closing and a signal for opening is input.

[Control Unit]

The control unit 24 is electrically connected to the actuator 40, and changes the volume of the pressure chamber 21 by deforming the actuator 40 by providing the actuator 40 with an electric signal. Thus, it is possible to suck a liquid into the capillary 10 and to discharge the liquid from the capillary 10. It is also possible to vibrate a liquid sucked into the capillary 10 by driving the actuator 40 so that the volume of the pressure chamber 21 periodically increases and decreases.

The control unit 24 is electrically connected to the valve 23, and opens and closes the valve 23 by providing the valve 23 with an electric signal. If a liquid flows into the first flow path 22, it is possible to discharge the liquid from the valve 23 to the outside by opening the valve 23. Moreover, it is possible to suck a large amount of liquid as follows: after sucking a liquid by deforming the actuator 40, the valve 23 is opened to restore the deformation of the actuator 40, and the actuator 40 is deformed again after closing the valve 23.

The control unit 24 includes, for example, although not particularly illustrated, a central processing unit (CPU), a read-only memory (ROM), a random-access memory (RAM), an external storage device (from another viewpoint, an integrated circuit element including at least a part of these), and the like. A functional unit that performs various operations as the CPU executes programs stored in the ROM and/or the external storage device is formed. The control unit 24 may be constituted by, for example, one or more integrated circuits (ICs). The control unit 24 may be immovably provided in the pipette body 20, may be provided so as to be movable relative to the pipette body 20, or a part of the control unit 24 (for example, a driver) may be immovably provided in the pipette body 20 and another part of the control unit 24 (for example, a part that outputs a command to the driver) may be provided so as to be movable relative to the pipette body 20.

[Capillary (Details)]

Figure 2:
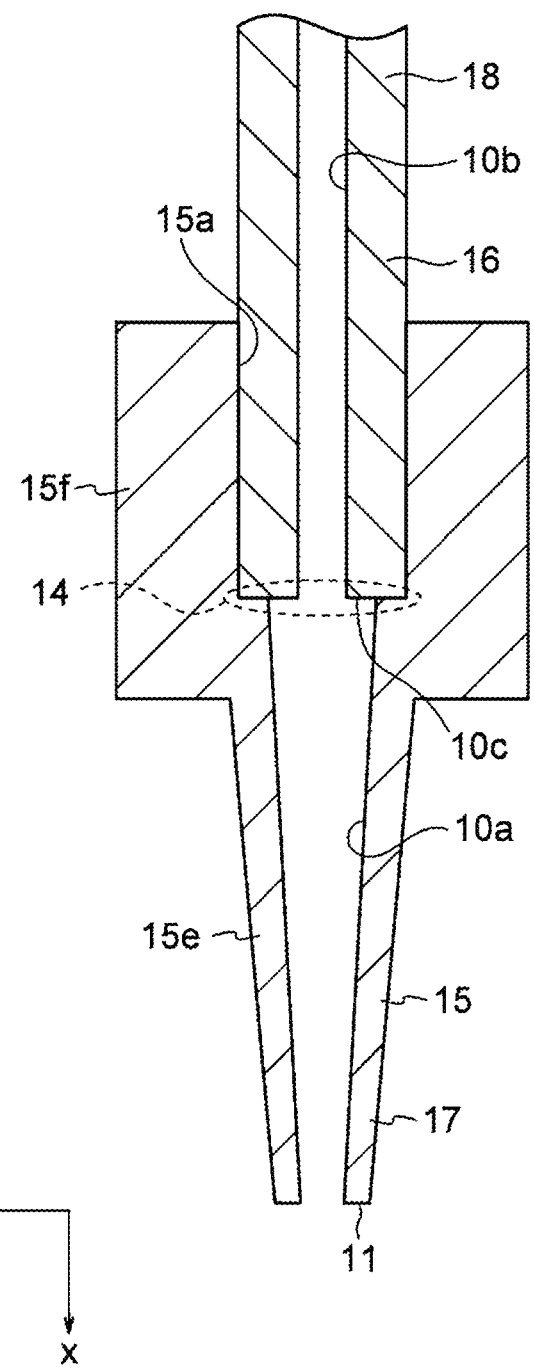
FIG. 2 is sectional view schematically illustrating a specific example of a capillary of the pipette according to the present disclosure.

FIG. 2 is an enlarged sectional view of the capillary 10.

The capillary 10 includes a first tube 17, which is located on the first end 11 side, and a second tube 18, which is located on the second end 12 side. The first tube 17 has a first hole 10*a*, which extends therethrough in the length direction, and the second tube 18 has a second hole 10*b*, which extends therethrough in the length direction. The second hole 10*b* is connected to a part of the first hole 10*a* on the second end 12 side. The first tube 17 is a part of the capillary 10 having the first hole 10*a*, and the second tube 18 is a part of the capillary 10 having the second hole 10*b*. The first tube 17 and the second tube 18 may be two parts of one integrally formed member (that is, need not be independent members), or may be two members that are fixed to each other.

(Water Repellency)

The water repellency of the inner surface of the first hole 10*a* and the water repellency of the inner surface of the second hole 10*b*, for example, differ from each other. That is, the capillary 10 has the first hole 10*a* and the second hole 10*b* whose inner surfaces have water repellencies that differ from each other. Thus, for example, when a liquid flows at a boundary 14 between these two holes, turbulence is likely to occur in the flow of the liquid due to the difference in water repellency. As a result, the liquid can be stirred easily.

However, the water repellencies of these two holes may be equivalent to each other. Any one of the water repellencies of the first hole 10a and the second hole 10b may be higher than the other.

In the present embodiment, an example in which the water repellency of the first hole 10a is higher than the water repellency of the second hole 10b will be described. That is, in the present embodiment, the contact angle of water in the first hole 10a is greater than the contact angle of water in the second hole 10b.

When the water repellency of the first hole 10a is higher than the water repellency of the second hole 10b, both of the first hole 10a and the second hole 10b may have water repellency (the contact angle of water may be greater than or equal to 90°), the first hole 10a may have water repellency and the second hole 10b may have hydrophilicity, or both of the first hole 10a and the second hole 10b may have hydrophilicity. In the present embodiment, among these three cases, either of the first two cases (a case where at least the first hole 10a has water repellency) will be described as an example.

In each of the first hole 10a and the second hole 10b, the water repellency may be uniform or may vary in the length direction of the capillary 10 and/or in a direction around the axis. In the present embodiment, an example in which the water repellency is uniform will be described. However, naturally, even when the water repellency is uniform, the water repellency may have some variation due to manufacturing error. When water repellency varies, the variation may be continuous or may be discontinuous (stepwise). Variation in water repellency between the first hole 10a and the second hole 10b is, for example, discontinuous.

The specific magnitude of the contact angle of water in each of the first hole 10a and the second hole 10b may be set in any appropriate manner. For example, when the first hole 10a has water repellency (when the contact angle of water is greater than or equal to 90°), the contact angle may be greater than or equal to 90° and less than or equal to 95° (that is, a value close to 90°), may be greater than or equal to 95° and less than or equal to 150°, or may be greater than 150°. An angle of greater than 150° is a magnitude of having so-called super-water repellency. When the second hole 10b has water repellency, as long as the contact angle of water in the second hole 10b is less than the contact angle of water in the first hole 10a, the contact angle of water in the second hole 10b may be greater than or equal to 90° and less than or equal to 95°, greater than or equal to 95° and less than or equal to 150°, or greater than 150°. When the second hole 10b has hydrophilicity (a case where the contact angle of water is less than 90°), the contact angle of water in the second hole 10b may be greater than or equal to 85° (that is, a value close to 90°), may be greater than or equal to 10° and less than or equal to 85°, or may be less than 10°. A contact angle of less than 10° is a magnitude having so-called super-hydrophilicity.

The difference between the contact angle of water in the first hole 10a and the contact angle of water in the second hole 10b may be set in any appropriate manner. For example, the difference between the two contact angles may be greater than or equal to 5°, greater than or equal to 10°, greater than or equal to 30°, greater than or equal to 90°, or greater than or equal to 140°. Unless contradictory to the lower limit, the difference between the two contact angles may be less than 180°, less than or equal to 140°, less than or equal to 90°, less than or equal to 30°, or less than or equal to or 10° (in any combination with the aforementioned lower limits). For example, the difference between the two contact angles may be greater than or equal to 30° and less than or equal to 140°, or greater than or equal to 30° and less than or equal to 90°. As the lower limit of the difference between the two contact angles increases, for example, the action of causing turbulence in flow intensifies. On the other hand, as the upper limit of the difference between the two contact angles increases, it becomes difficult to select the material. In the aforementioned range, for example, it becomes easy to select the material while obtaining the action of causing turbulence in flow.

(Shapes of Holes and Others)

The shapes and sizes of the first hole 10a and the second hole 10b and the materials and the like for forming these holes may be set in any appropriate manner. Examples of these are as follows.

The first hole 10a extends, for example, from the first end 11 to the boundary 14. The second hole 10b extends, for example, from the boundary 14 to the second end 12. The position of the boundary 14 may be any appropriate position between the first end 11 and the second end 12. For example, the boundary 14 is located closer than the center of the capillary 10 in the length direction of the capillary 10 to the first end 11. For example, the length of the first hole 10a is about 5% to 30% of the total length of the capillary 10.

The shape and/or size of the cross section of the first hole 10a and the shape and/or size of the cross section of the second hole 10b may be the same as each other or may differ from each other. When the sizes of these two differ, either one of these may be greater. In each of the first hole 10a and the second hole 10b, the shape and/or size of the cross section may be uniform or need not be uniform in the length direction of the capillary 10.

In the illustrated example, the size of the cross section (inside diameter) of the first hole 10a increases toward the second hole 10b. That is, the inner surface of the capillary 10 includes, in at least a part thereof, a tapered surface (the inner surface of the first hole 10a) along which the diameter thereof decreases toward the first end 11. On the other hand, the size of the cross section (inside diameter) of the second hole 10b is uniform in the length direction of the capillary 10. At the boundary 14, the inside diameter of the first hole 10a is greater than the inside diameter of the second hole 10b. That is, a step 10c is formed at the boundary 14.

The specific magnitudes and the like of the inside diameter of the first hole 10a and the inside diameter of the second hole 10b may be set in any appropriate manner. For example, at the boundary 14, the inside diameter of the first hole 10a is greater than or equal to 1.1 times, greater than or equal to 1.5 times, or greater than or equal to 2 times the inside diameter of the second hole 10b and is less than or equal to 5 times, less than or equal to 3 times, or less than or equal to 2 times the inside diameter of the second hole 10b (the examples of the lower limits and the examples of the upper limits may be combined in any appropriate manner unless contradiction arises). For example, the difference between the inside diameter of the first hole 10a and the inside diameter of the second hole 10b is greater than or equal to 2/5 times, greater than or equal to 2/3 times, or greater than or equal to 1 time the thickness (the length from the inner surface to the outer surface in the radial direction) of a second member 16 (described below) and is less than 2 times, less than or equal to 9/5 times, or less than or equal to 2/5 times the thickness of the second member 16 (the examples of the lower limits and the examples of the upper limits may be combined in any appropriate manner unless contradiction arises). For example, the inclination angle of the inner surface of the first hole 10a with respect to the center line of the first hole 10a is greater than or equal to 1°, greater than or equal to 2°, or greater than or equal to 3° and is less than or equal to 15°, less than or equal to 10°, or less than or equal to 7° (the examples of the lower limits and the examples of the upper limits may be combined in any appropriate manner).

The inside diameter of the first hole 10a at the first end 11 may be less than, equal to (including a case where a difference due to manufacturing error exists), or greater than the inside diameter of the second hole 10b. For example, the inside diameter of the first hole 10a at the first end 11 is greater than or equal to 1/2 times, greater than or equal to 2/3 times, or greater than or equal to 4/5 times the inside diameter of the second hole 10b and is less than 2 times, less than or equal to 1.5 times, or less than or equal to 1.2 times the inside diameter of the second hole 10b (the examples of the lower limits and the examples of the upper limits may be combined in any appropriate manner).

(First Member and Second Member)

The capillary 10 incudes a first member 15, which forms the first hole 10a, and the second member 16, which forms the second hole 10b. By forming the capillary 10 from a plurality of members in this way, for example, it becomes easy to make the water repellency of the first hole 10a and the water repellency of the second hole 10b differ from each other.

The first member 15 and the second member 16 each may be made of any of the materials of the capillary 10 already listed above. For example, all of the first member 15 is integrally made of a resin. For example, all of the second member 16 is integrally made of glass. The water repellency of the resin, which is material of the first member 15, is higher than the water repellency of the glass, which is material of the second member 16.

The material of the second member 16 may be a material having light transmittance, and the material of the first member 15 may be a material having or not having light transmittance. In other words, the light transmittance of the second member 16 may be higher than the light transmittance of the first member 15. In this case, for example, a material having high water repellency can be selected as the material of the first member 15. On the other hand, a material that is suitable for irradiating a liquid with light for analysis of the liquid can be selected as the material of the second member 16.

The first member 15 and the second member 16 may be fixed by using any appropriate method. Examples of the fixing method include fitting (press-fitting) of one of the members into the other member, engagement using a latch and the like, bonding using an adhesive, and welding by melting and solidifying at least one of the members. Any two or more of these methods may be combined. These two members may be formed by forming one of the members beforehand and then filling the inside of a die, in which the member is placed, with a material to become the other member. Between the first member 15 and the second member 16, a packing, which is made of a material whose rigidity is lower than the rigidity of these, may be disposed.

In the illustrated example, the first member 15 and the second member 16 are fixed by fitting the second member 16 into the first member 15. To be specific, the first member 15 has a third hole 15a extending from the first hole 10a toward a side opposite to the first end 11. The inside diameter of the third hole 15a is greater than the inside diameter of the first hole 10a. The outside diameter of the second member 16 is equivalent to or slightly greater than the inside diameter of the third hole 15a. The second member 16 is inserted into the third hole 15a from a side opposite to the first hole 10a. A front end of the second member 16 is pressed against a step (without a reference sign) at the boundary between the first hole 10a and the third hole 15a. Unintended removal of the second member 16 from the first member 15 is prevented by friction that is generated due to the direct contact of these two members.

Even when the second member 16 is inserted into the first member 15 in this way, these two members may be joined to each other. For example, an adhesive may be disposed between the inner surface of the third hole 15a and the outer surface of the second member 16. In this case, the outside diameter of the second member 16 may be slightly less than, equivalent to, or slightly greater than the inside diameter of the third hole 15a.

The outer shapes (the shapes of the outer surfaces) the first member 15 and the second member 16 each may be any appropriate shape. In the illustrated example, the first member 15 includes, in an external view thereof, a first portion 15e, which has the first end 11, and a second portion 15f, which is located closer than the first portion 15e to the second end 12.

The first portion 15e has, for example, a part (in the illustrated example, most part) of the first hole 10a on the first end 11 side. The thickness (the length from the inner surface to the outer surface of) the first portion 15e is, for example, substantially uniform over the entire length in the length direction of the capillary 10. The outer shape of the first portion 15e is tapered to correspond to the tapered shape of the first hole 10a. The thickness of the first portion 15e is comparatively small and, for example, less than the thickness of the second member 16.

The second portion 15f has, for example, the third hole 15a and a part of the first hole 10a on a side opposite to the first end 11. The second portion 15f has, for example, an outside diameter greater than that of the first portion 15e. The thickness of the second portion 15f is comparatively large and, for example, greater than each of the thickness of the first portion 15e and the thickness the second member 16. The shape of the outer surface of the second portion 15f is, for example, uniform in the length direction of the capillary 10.

The second member 16 has, for example, a thickness (the length from the inner surface to the outer surface) that is substantially uniform over the entire length in the length direction of the capillary 10. The outer shape of the second member 16 extends with a uniform diameter to correspond to the second hole 10b that extends with a uniform diameter.

[Series of Operations of Pipette]

Exemplary operations of the pipette 1 will be described. The operations described below are performed, for example, in an environment in which the ambient pressure of the pipette 1 is constant. The ambient pressure is, for example, the atmospheric pressure. However, the ambient pressure may be lower than or higher than the atmospheric pressure.

Figure 3:
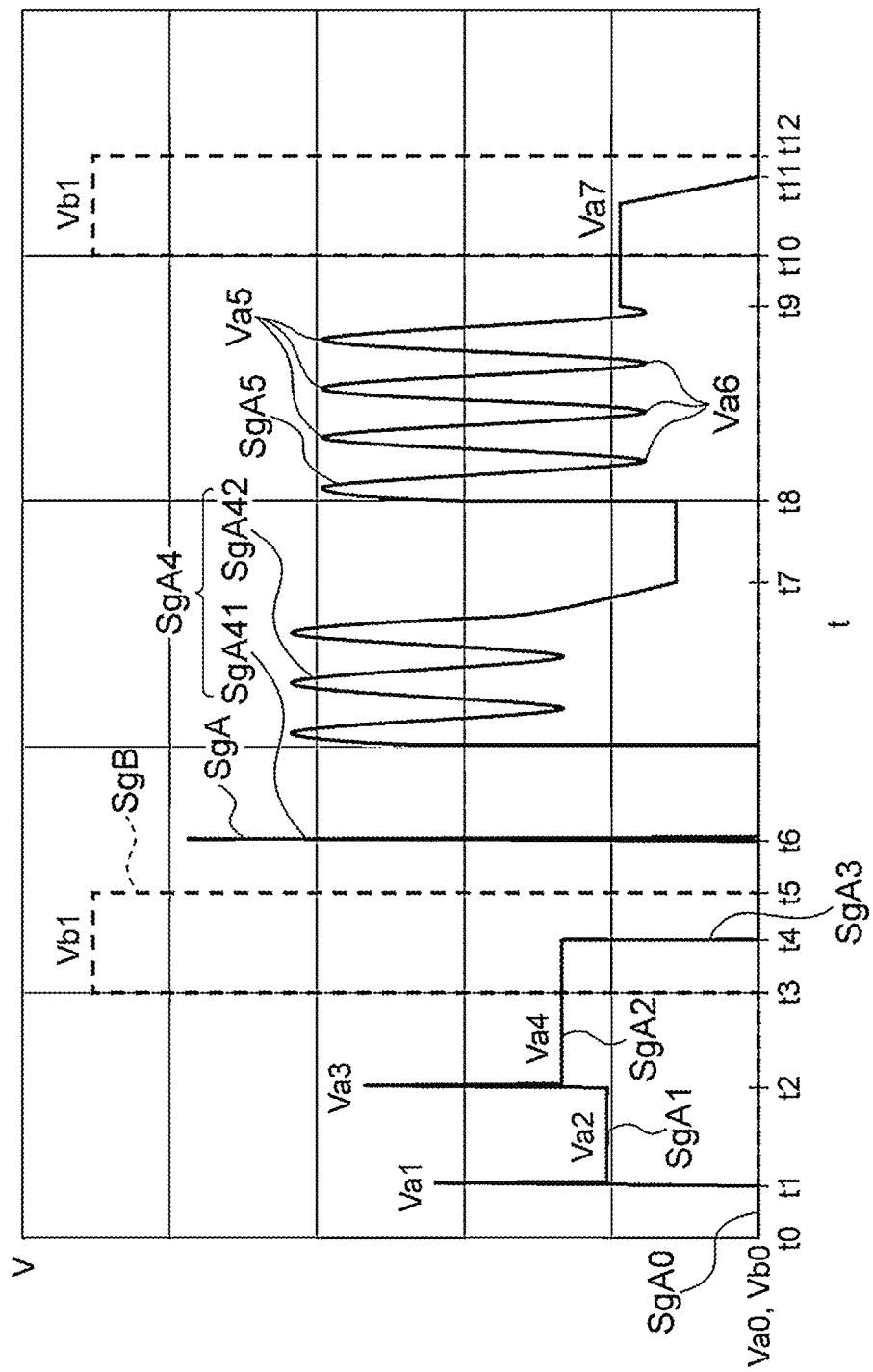
FIG. 3 is a graph schematically illustrating an example of the waveforms of signals that a control unit of the pipette of FIG. 1 outputs.

FIG. 3 is a graph schematically illustrating examples of the waveforms of driving signals that the control unit 24 outputs. The waveforms of the driving signals are, in other words, changes over time of the signal levels (such as the voltages) of the driving signals. In this figure, the horizontal axis t represents time. The vertical axis V represents voltage as a signal level. The lines in the figure represent the waveform of a first driving signal SgA that the control unit 24 outputs to the actuator 40 and the waveform of a second driving signal SgB that the control unit 24 outputs to the valve 23. FIGS. 4A to 4D are schematic views each illustrating the state of the capillary 10 at a corresponding time on the horizontal axis of FIG. 3.

The signal level of the first driving signal SgA that the control unit 24 outputs to the actuator 40 is a voltage (or a physical quantity correlated to a voltage). The actuator 40 bends with a deformation amount corresponding to an applied voltage. Here, the term "correspond" means, for example, one-to-one correspondence, and, in other words, a deformation amount is uniquely determined with respect to a voltage (excluding a state in which deformation is saturated). Accordingly, when the first driving signal Sg is input to the actuator 40, the actuator 40 changes the volume of the pressure chamber 21 to follow the waveform (sequential change in the voltage) of the first driving signal SgA so that the volume of the pressure chamber 21 becomes a volume corresponding to the voltage of the first driving signal SgA.

The relationship between the amount of change in the voltage of the first driving signal SgA and the amount of change in the volume of the pressure chamber 21 is not limited to a proportional relationship. However, for convenience, a proportional relationship or a relationship close to a proportional relationship will be assumed and described. Accordingly, FIG. 3 may be regarded as representing not only a sequential change in the voltage of the first driving signal SgA but also a sequential change in the volume of the pressure chamber 21.

A reference potential is applied to one of the inner electrode 42 and the surface electrode 44, and the first driving signal SgA is input to the other. The voltage in FIG. 3 represents the potential difference between the reference potential and the first driving signal SgA. In other words, the first driving signal SgA is an unbalanced signal. However, the first driving signal SgA may be a balanced signal such that the potentials at both of the inner electrode 42 and the surface electrode 44 are changed and the potential difference between these electrodes is the voltage illustrated in FIG. 3. In the present embodiment, a case where the first driving signal SgA is an unbalanced signal will be used as an example, and thus the following description may be made based on an assumption that the voltage in FIG. 3 is the potential of the first driving signal SgA.

Increase in the voltage of the first driving signal SgA (change in potential toward the positive side) may correspond to increase in the volume of the pressure chamber 21 or may correspond to decrease in the volume of the pressure chamber 21. In other words, the direction from one of the inner electrode 42 and the surface electrode 44 to which the first driving signal SgA is applied to the other electrode to which the reference potential is applied may be opposite to or the same as the polarization direction of the piezoelectric ceramic layer 40a. Hereafter, for convenience, it is assumed that increase in the voltage of the first driving signal SgA corresponds to increase in the volume of the pressure chamber 21 (that is, suction of a liquid).

The signal level (such as the voltage) of the second driving signal SgB that the control unit 24 outputs to the valve 23 is, for example, one of two voltages Vb0 and Vb1 corresponding to the open state and the closed state of the valve 23. Although whichever one of the voltages may correspond to the open state or the closed state, in the following description, an example in which the valve is in the closed state when the voltage is Vb0 and in the open state when the voltage is Vb1 will be used. The second driving signal SgB may be a balanced signal or may be an unbalanced signal, as with the first driving signal SgA. Hereafter, for convenience, the voltage in FIG. 3 may be described as the potential of the second driving signal SgB. One of the potentials Vb0 and Vb1 may be the reference potential. Unlike the illustrated example, the voltage of the second driving signal SgB may be set to a voltage between the voltages Vb0 and Vb1 so as to appropriately adjust the opening degree of the valve 23.

The relative relationship between the potential of the first driving signal SgA and the potential of the second driving signal SgB may be set in any appropriate manner. Hereafter, for convenience, the potential Va0 of the first driving signal SgA at time t0 is illustrated to have the same value as the aforementioned potential Vb0 of the second driving signal SgB. In practice, these two may be different. The differences between other potentials of the first driving signal SgA and the aforementioned potential Vb1 illustrated in the figure are not necessarily actual differences.

When the potential of the first driving signal SgA is a predetermined potential (such as the potential Va0), the predetermined potential may be the reference potential. At this time, the control unit 24 may be performing an operation of not outputting the first driving signal SgA. However, in the following description, for convenience, even regarding a state in which the first driving signal SgA is not output, it may be represented that the first driving signal SgA is output with the aforementioned predetermined potential. The same applies to the second driving signal SgB.

In the following description, not only the operation of the pipette 1 itself, but also an operation performed by a user of the pipette 1 or performed by a device that uses (or includes) the pipette 1 will also be described. Here, an example in which a user operates the pipette 1 will be described. An operation performed by the user on the pipette 1 may be read as an operation performed by a device on the pipette 1, as appropriate. For example, movement of the pipette 1 by the user may be read as movement of the pipette 1 by the device, and an operation by the user on a switch (not illustrated) of the pipette 1 may be read as output of a command signal by the device to the pipette 1. For example, the device may perform on the pipette, by sequence control, an operation similar to that performed by the user.

(Time t0 to t1: Liquid Contact and Others)

Before time t1, the control unit 24 outputs an initial signal SgA0 to the actuator 40 in response to the user's operation on a switch (not illustrated) (from time t0 to t1). The initial signal SgA0 is a signal having a constant potential (here, the potential Va0). Thus, the volume of the pressure chamber 21 is maintained at a predetermined initial volume. The potential Va0 may be the reference potential or may be different from the reference potential.

In the following description, the valve 23 is closed at least after time t1, unless otherwise noted. From time t0 to t1, the valve 23 may be closed, or may be open. For example, the valve 23 may be closed or may be open when the initial signal SgA0 is a signal that does not cause the actuator 40 to generate a driving force. For example, the valve 23 may be open when the initial signal SgA0 is a signal that drives the actuator 40 to make the volume of the pressure chamber 21 smaller than the volume of the pressure chamber 21 before time t0.

Before time t1, the user causes the first end 11 of the capillary 10 to contact a first liquid L1 (performs a liquid-contacting step). Then, the user operates a switch (not illustrated) of the pipette 1 to instruct the pipette 1 to suck the first liquid L1. The time of this instruction corresponds to time t1 in FIG. 3.

(Time t1 to t2: Suction of First Liquid and Others)

When instructed to suck the first liquid L1, the control unit 24 outputs a first suction signal SgA1 that drives the drive unit 50 to increase the volume of the pressure chamber 21. The first suction signal SgA1 is, for example, a signal that increases to a predetermined potential Va1 from the potential Va0 of the initial signal SgA0, then decreases to a predetermined potential Va2, and maintains the potential Va2. As the volume of the pressure chamber 21 increases, as illustrated in FIG. 4A, the first liquid L1 is sucked into the capillary 10 and held near the first end 11 of the capillary 10.

Basically, a liquid is sucked into the capillary 10 when the volume of the pressure chamber 21 increases, and suction of the liquid is stopped when increase in the volume of the pressure chamber 21 stops. Accordingly, unlike the illustrated example, the first suction signal SgA1 may be a signal that realizes such a change in the volume of the pressure chamber 21. That is, the first suction signal SgA1 may be a signal that increases from the potential Va0 to a predetermined potential and maintains the predetermined potential. In this case, the potential difference between the potential Va0 and the predetermined potential is set in accordance with the amount of the first liquid L1 to be sucked.

When the first suction signal SgA1 is a signal that increases to the potential Va1 and then decreases to the potential Va2 as in the illustrated example, for example, it is possible to increase the accuracy in measurement of the amount of liquid. The specifics are as follows.

If the volume of the pressure chamber 21 is simply increased to a certain size, a phenomenon may occur in that suction of a liquid is continued even when increase in the volume is stopped. Such a phenomenon occurs, for example, due to an inertial force acting on the liquid. In some cases, it is difficult to disregard such a phenomenon. For example, in a case where a very small amount of liquid is to be sucked, variation in suction amount that occurs due to the phenomenon is likely to become relatively large. As a result, it becomes difficult to suck the liquid with an intended accuracy.

It is possible to reduce the probability of the occurrence of the aforementioned phenomenon by causing a braking force against the inertial force to act on the liquid by reducing the potential from the potential Va1 to the potential Va2 to reduce the volume of the pressure chamber 21 (to increase the pressure of the inside of the capillary 10). With the first suction signal SgA1 having such a waveform, for example, it is possible to realize any suction amount by adjusting the potential difference between the potentials Va0 and Va1, the potential difference between the potentials Va1 and Va2, the time (pulse width) for which the potential changes from Va0 to Va2 via Va1, and the like. In the illustrated example, the pulse width is relatively short, and the waveform from the potential Va0 to the potential Va2 via the potential Va1 is illustrated in an impulse-like shape.

When a part of the first liquid L1 is sucked into the capillary 10, the user raises the capillary 10 from the remainder of the first liquid L1 (performs a liquid-separating step). Next, the user causes the first end 11 of the capillary 10 to contact a second liquid L2 (performs a liquid-contacting step). Then, the user operates a switch (not illustrated) of the pipette 1 to instruct the pipette 1 to suck the second liquid L2. The time of this instruction corresponds to time t2 in FIG. 3.

(Time t2 to t3: Suction of Second Liquid and Others)

When instructed to suck the second liquid L2, the control unit 24 outputs a second suction signal SgA2 that drives the drive unit 50 to increase the volume of the pressure chamber 21. The second suction signal SgA2 is, for example, a signal that increases to a predetermined potential Va3 from the potential Va2 at the end of the first suction signal SgA1, then decreases to a predetermined potential Va4, and maintains the potential Va4. As the volume of the pressure chamber 21 increases, as illustrated in FIG. 4B, the second liquid L2 is sucked into the capillary 10 and held near the first end 11 of the capillary 10.

The effect of the second suction signal SgA2 having a waveform such that the potential increases and then decreases is similar to that of the first suction signal SgA1. The suction amount of the second liquid L2 is determined, for example, by adjusting the potential difference between the potentials Va2 and Va3, the potential difference between the potentials Va3 and Va4, the time (pulse width) for which the potential changes from Va2 to Va4 via Va3, and the like. In the illustrated example, the pulse width is relatively short, and the waveform from the potential Va2 to the potential Va4 via the potential Va3 is illustrated in an impulse-like shape. Unlike the illustrated example, the second suction signal SgA2 may be a signal that increases from the potential Va2 to a predetermined potential and maintains the predetermined potential.

When a part of the second liquid L2 is sucked into the capillary 10, the user raises the capillary 10 from the remainder of the second liquid L2 (performs a liquid-separating step). Then, the user operates a switch (not illustrated) of the pipette 1 to instruct the pipette 1 to perform the next process. The time of this instruction corresponds to time t3 in FIG. 3. Between time t3 and time t12, the control unit 24, for example, outputs various signals in a predetermined order and at predetermined timings. However, the control unit 24 may start outputting at least one of the various signals at the time when an operation on the pipette 1 is performed.

(Time t3 to t5: Recovery of Pressure Chamber and Others)

Between time t3 and time t5, the control unit 24 reduces the volume of the pressure chamber 21 to an appropriate volume (in the illustrated example, the initial volume at time t0) while holding the liquid near the first end 11. Thus, for example, when the volume of the pressure chamber 21 is to be increased to move (draw up) the liquids (L1 and L2) toward the second end 12, it is possible to increase the amount of the volume of the pressure chamber 21 that can be increased. The specifics are as follows.

At time t3, the control unit 24 starts control for opening the valve 23. That is, the control unit 24 starts outputting a signal having the potential Vb1, which is a part of the second driving signal SgB, to the valve 23. Thus, the pressure of a part of the inside the capillary 10 that is closer than the liquids (L1 and L2) to the second end 12 becomes equivalent to the ambient pressure of the pipette 1 via the open flow path 28.

Next, if the control unit 24 determines that a predetermined time has elapsed after control for opening the valve 23 is started (at time t4), the control unit 24 outputs a recovery signal SgA3 that drives the drive unit 50 so that the volume of the pressure chamber 21 decreases. The recovery signal SgA3 is, for example, a signal whose potential decreases from the potential Va4 of the second suction signal SgA2 to a predetermined potential (as an example, the potential Va0 at time t0) and maintains the predetermined potential Va0.

Due to the recovery signal SgA3, the volume of the pressure chamber 21 decreases. However, because the valve 23 is open as described above, the pressure of a part of the inside of the capillary 10 that is closer than the liquids (L1 and L2) to the second end 12 is not increased. As a result, the positions of the liquids do not change.

The length of time from time t3 to time t4 may be set in any appropriate manner, and, for example, may be a time that is sufficient for opening the valve 23. The potential of the recovery signal SgA3 reduced from the potential Va4 may be, unlike the illustrated example, higher than or lower than the initial potential Va0 (and/or the reference potential).

Subsequently, if the control unit 24 determines that a predetermined time has elapsed from time t4 (at time t5), the control unit 24 starts control for closing the valve 23. That is, the control unit 24 starts outputting a signal having the potential Vb0, which is a part of the second driving signal SgB, to the valve 23. The length of time from time t4 to time t5 may be set in any appropriate manner, and, for example, may be a time that is sufficient for the actuator 40 to become displaced by an amount corresponding to the potential of the recovery signal SgA3 after having been reduced (here, Va0).

(Time t6 to t7: Raising of Liquid and Others)

If the control unit 24 determines that a predetermined time has elapsed from time t5 (at time t6), the control unit 24 outputs to the actuator 40 a movement signal SgA4 for moving the liquids (L1 and L2) toward the second end 12 (drawing up the liquid). Thus, as illustrated in FIGS. 4B and 4C, a liquid L3, including the first liquid L1 and the second liquid L2, moves from an initial position P0 near the first end 11 to a finish position P2, which is closer than the initial position P0 to the second end 12, and stops at the finish position P2.

The initial position P0 and the finish position P2 may be, for example, defined as positions where a certain part of the liquid L3 is to reach. The certain part may be, for example, any of the lower surface, the upper surface, the center, or the like of the liquid L3. The same applies to other positions (such as a mid-position P1) described below.

The finish position P2 may be any position that is closer than the initial position P0 to the second end 12. From another viewpoint, the finish position P2 may be any position where all of the liquid L3 is separated from the first end 11. In the illustrated example, the finish position P2 is a position where all of the liquid L3 is located inside of the second hole 10b. In other words, the finish position P2 is a position where all of the liquid L3 has moved toward the second end 12 across the boundary 14 between the first hole 10a and the second hole 10b (from another viewpoint, the step 10c). To be more specific, the finish position P2 is a position where all of the liquid L3 is located in a part of the second member 16 exposed to the outside (in the illustrated example, a part that is not covered by the first member 15).

The length of time from time t5 to time t6 may be set in any appropriate manner, and, for example, may be a time sufficient for closing the valve 23. The waveform of the movement signal SgA4 will be described below.

(Time t8 to t9: Mixing and Others)

If the control unit 24 determines that a predetermined time has elapsed after drawing up of the liquid L3 is finished (at time t8), the control unit 24 outputs a mixing signal SgA5 for driving the drive unit 50 so that the volume of the pressure chamber 21 repeats increase and decrease. Thus, the liquid L3 repeats, in the second hole 10b, movement toward the second end 12 and movement toward the first end 11. For example, the liquid L3 reciprocates between the position illustrated in FIG. 4C and the position illustrated in FIG. 4D. As a result, the liquid L3 is stirred, and the first liquid L1 and the second liquid L2 become mixed.

In order to realize the operation described above, the mixing signal SgA5 has a waveform such that the potential repeats increase and decrease. The number of repetitions may be set in any appropriate manner. For example, as long as the potential repeats increase and decrease, the potential may increase twice or more and the potential may decrease twice or more. The waveform may be curved (for example, like a sine wave) as in the illustrated example, or may be, unlike the illustrated example, a rectangular wave, a triangular wave, or a sawtooth wave.

The amplitude of the waveform may be constant, or may change. From another viewpoint, a plurality of maximal values Va5 of the potential may be the same as each other or may differ from each other. A plurality of minimal values Va6 of the potential may be the same as each other or may differ from each other. In the illustrated example, the plurality of maximal values Va5 are the same as each other, and the plurality of minimal values Va6 are the same as each other.

The first change in the potential of the mixing signal SgA5 may be increase in the potential, or may be decrease in the potential. Likewise, the last change in the potential of the mixing signal SgA5 may be increase in the potential, or may be decrease in the potential. When the first change in the potential and the last change in the potential are opposite to each other (increase and decrease), the position of liquid is likely to be maintained before and after mixing. In the illustrated example, the mixing signal SgA5 generally (disregarding slight increase in the potential near time t9) has a waveform such that the potential increases first and the potential decreases last.

In the illustrated example, the minimal value of the mixing signal SgA5 is slightly higher than the potential at the time when the mixing signal SgA5 is started to be output (time t8). From another viewpoint, the amount of the first increase in the potential is higher than the amount of each of the second and later increases in the potential. The reason for this is, for example, as follows. Before the first increase in the potential starts, the pressure of a gas that is closer than the liquid L3 to the first end 11 is equivalent to the pressure of the outside of the pipette 1. On the other hand, before each of the second and later increases in the potential starts, the gas that is closer than the liquid L3 to the first end 11 has been compressed due to immediately preceding decrease in the potential (flow of the liquid L3 toward the first end 11), and the pressure of the gas is slightly higher than the pressure outside of the pipette 1. This is due to resistance that is generated when the gas is discharged from the first end 11. In consideration of this difference in pressure, the amount of the first increase in the potential is made slightly larger.

In the mixing signal SgA5 of the illustrated example, at the end of the repetitions of increase and decrease in the potential (near time t9), the potential decreases from the maximal value Va5 to the minimal value Va6, and then slightly increases to a potential Va7. The slight increase in the potential contributes to, for example, as mentioned above in the description of the first suction signal SgA1, cause a braking force against an inertial force, which is acting on the liquid L3, to act on the liquid L3. Thus, for example, it becomes easier to make the position of the liquid L3 at the time when mixing is finished to be close to the position of the liquid L3 at the time when mixing is started (time t8).

(Time t9 to t12: Holding of Liquid and Others)

If the control unit 24 determines that a predetermined time has elapsed after mixing of the liquid L3 is finished (at time t10), the control unit 24 maintains the position of the liquid L3. This operation may be an operation of only maintaining a potential Va7. However, in the illustrated example, a process for reducing a load on the actuator 40 is performed. The specifics are as follows.

In describing this process, it is assumed that at least the potential Va0, among the potentials Va0 and Vb0, is the reference potential (from another viewpoint, a state in which a signal is not output). The operation of the control unit 24 from time t10 to time t12 is similar to that from time t3 to time t5, except for specific values and the rate of change in the potential. That is, in a state in which the valve 23 is open, input of the first driving signal SgA to the actuator 40 is stopped (from time t10 to t11). Thus, the volume of the pressure chamber 21 decreases due to a recovery force. Because the valve 23 is open, the pressure of the inside of the capillary 10 closer than the liquid L3 to the second end 12 does not change, and the position of the liquid L3 is maintained. Subsequently, the valve 23 is closed (at time t12), and movement of the liquid L3 is restricted.

Subsequently, for example, in a state in which the liquid L3 is held in the capillary 10 (for example, in the second member 16), the liquid L3 is irradiated with light from a side of the capillary 10, and the properties of the liquid L3 are measured. For example, fluorescence measurement, scatter measurement, light-absorption measurement, and/or spectroscopic measurement is performed. Before the measurement, the liquid may be moved from a position immediately after being mixed to a position suitable for measurement.

[Drawing-Up of Liquid]
(Movement Signal)

Figure 5:
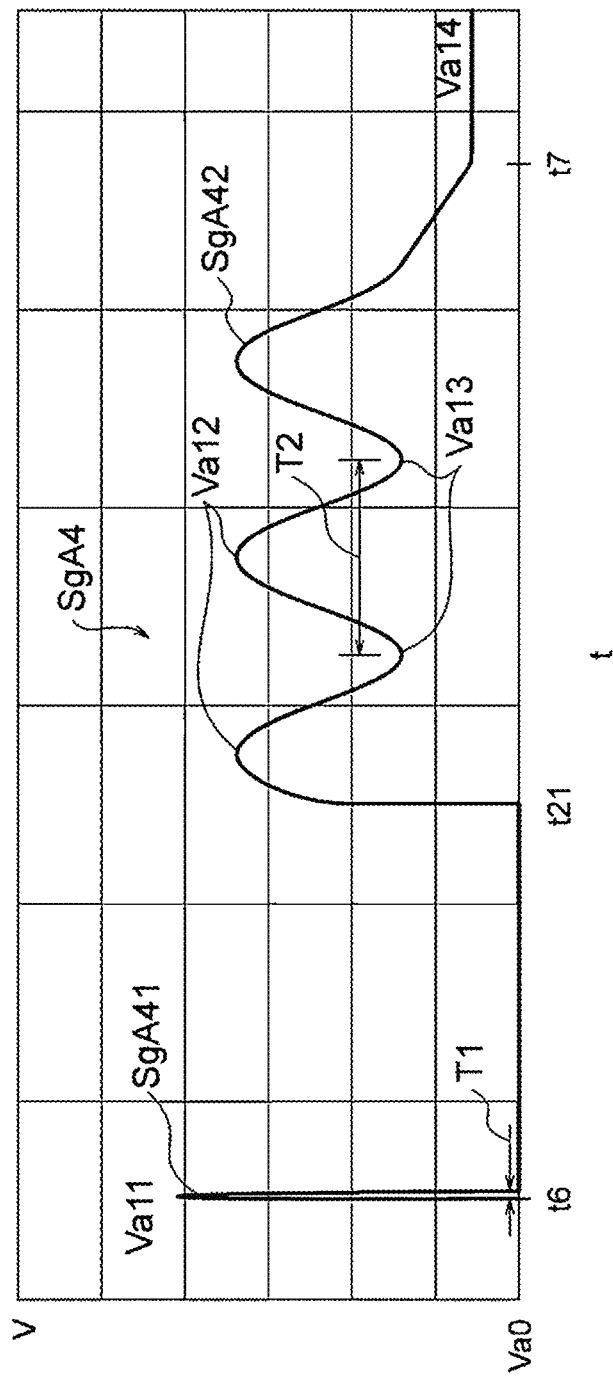
FIG. 5 is a partial enlarged view of FIG. 3.

FIG. 5 illustrates a part of FIG. 3 (substantially the range from time t6 to t7) with a different ratio between the vertical axis and the horizontal axis. In FIG. 5, the waveform of the movement signal SgA4 for drawing up a liquid is illustrated. FIGS. 6A to 6D are schematic views each illustrating the state of the capillary 10 at a corresponding time on the horizontal axis of FIG. 5.

The movement signal SgA4 includes, for example, an initial movement signal SgA41, which is output at time t6, and a vibrational movement signal SgA42, which is output subsequently.

The initial movement signal SgA41 contributes to, for example, movement of the liquid from the initial position P0 illustrated in FIG. 4B to the mid-position P1 illustrated in FIG. 6A. The vibrational movement signal SgA42 contributes to, for example, movement of the liquid from the mid-position P1 to the finish position P2 illustrated in FIG. 4C. The movement signal SgA4 may be configured, without having the initial movement signal SgA41, to move the liquid from the initial position P0 to the finish position P2 due to the vibrational movement signal SgA42.

The mid-position P1 may be any position that is closer to the second end 12 than the initial position P0 and that is closer to the first end 11 than the finish position P2. In the illustrated example, the mid-position P1 is a position such that all of the liquid L3 can be contained in the first hole 10a. In other words, the mid-position P1 is a position such that all of the liquid L3 does not reach the boundary 14 between the first hole 10a and the second hole 10b (from another viewpoint, the step 10c) or the upper surface of the liquid L3 is in contact with the step 10c.

(Initial Movement Signal)

In the illustrated example, the initial movement signal SgA41 has a waveform such that, for example, the potential increases in a comparatively short time (pulse width) and subsequently the potential decreases. That is, the initial movement signal SgA41 has a pulse-like (further, impulse-like) waveform. However, although the pulse width (the period T1 from the time when increase in potential is started to the time when decrease in the potential is finished) is comparatively short, the pulse width has a length of time that allows the actuator 40 to be displaced in accordance with a change in potential. Accordingly, the actuator 40 increases and decreases the volume of the pressure chamber 21 in accordance with increase and decrease in the potential of the initial movement signal SgA41.

The initial movement signal SgA41, which includes increase and decrease in the potential, produces effects similar to those of the first suction signal SgA1. That is, as the volume of the pressure chamber 21 increases, the pressure of the inside of the capillary 10 closer to the second end 12 than the liquid L3 is reduced, and the liquid L3 flows from the initial position P0 toward the mid-position P1. As the volume of the pressure chamber 21 subsequently decreases, the pressure of the inside of the capillary 10 closer to the second end 12 than the liquid L3 is increased, and a braking force against an inertial force, which acts on the liquid L3 toward the second end 12, acts on the liquid L3. Due to the action of the braking force, the accuracy in the stopping position of the liquid L3 increases.

Regarding the first suction signal SgA1, the potential Va2 after having been reduced is higher than the potential Va0 before being increased. On the other hand, regarding the initial movement signal SgA41, the potential after having been reduced is equivalent to the potential Va0 before being increased. The initial movement signal SgA41 moves the liquid L3 with a voltage Va11 that is higher than the voltage Va1 of the first suction signal SgA1. In order to stop the liquid L3, the initial movement signal SgA41 is set so that the voltage thereof decreases to Va0, unlike the first suction signal SgA1.

The movement amount of the liquid L3 can be determined, for example, by adjusting the potential difference between the potentials Va0 and Va11, the length of the period T1, and the like as parameters. The period T1 may be set in any appropriate manner, and may be comparatively short as described above. The length of the period T1 and the like will be described below in comparison with the length of time related to the vibrational movement signal SgA42.

Depending on the configuration of the capillary 10 and the like, unlike the illustrated example, the initial movement signal SgA41 may have a waveform such that the potential does not decrease to the potential Va0, which is the potential before increase (a waveform similar to that of the first suction signal SgA1). In this case, the movement amount of the liquid L3 may be determined, in a way similar to the suction amount of the first liquid L1 due to the first suction signal SgA1, by adjusting the potential difference at the time of increase, the potential difference at the time of decrease, the period T1, and the like. A braking force need not act on the liquid, and the initial movement signal SgA41 may have a waveform that simply increases the potential to a predetermined potential corresponding to a movement amount.

(Vibrational Movement Signal)

If the control unit 24 determines that a predetermined time has elapsed after the liquid L3 is moved to the mid-position P1 (at time t21), the control unit 24 starts outputting the vibrational movement signal SgA42. As with the mixing signal SgA5, the vibrational movement signal SgA42 has a waveform such that the potential repeats increase and decrease. As a result, the volume of the pressure chamber 21 repeats increase and decrease. Thus, the liquid L3 gradually moves from the mid-position P1 to the finish position P2 while repeating movement in a direction from the mid-position P1 toward the finish position P2 and movement in the opposite direction.

FIGS. 6A to 6D schematically illustrate a part of the movement of the liquid L3 while the liquid L3 vibrates. That is, the liquid L3 rises from the mid-position P1 illustrated in FIG. 6A to a position P21 illustrated in FIG. 6B. The position P21 is a position that is closer than the finish position P2 to the mid-position P1. Next, the liquid L3 moves from the position P21 to a position P22 illustrated in FIG. 6C. The position P22 is a position that is closer than the mid-position P1 to the finish position P2. Next, the liquid L3 moves from the position P22 to a position P23 illustrated in FIG. 6D. The position P23 is a position that is closer to the finish position P2 than the position P21 at the time of immediately preceding rise. Although not particularly illustrated, next, the liquid L3 moves to a position that is closer to the mid-position P1 than the position P23 and that is closer to the finish position P2 than the position P21 in FIG. 6B (position at the time of immediately preceding lowering). The liquid L3 moves from the mid-position P1 to the finish position P2 while repeating such a vibration appropriate times.

Unlike the illustrated example, the liquid L3 may gradually move to the finish position P2 while repeating movement in a direction from the mid-position P1 toward the finish position P2 and stopping of the movement, as the volume of the pressure chamber 21 increases and decreases.

The number of repetitions of increase and decrease in the potential of the vibrational movement signal SgA42 (repetitions of increase and decrease in the volume of the pressure chamber 21) may be set in any appropriate manner. For example, as long as the volume repeats increase and decrease, the volume of the pressure chamber 21 may increase twice or more and the volume of the pressure chamber 21 may decrease twice or more. The waveform of the vibrational movement signal SgA42 may be formed of a curve (for example, like a sine wave) as in the illustrated example, or may be, unlike the illustrated example, a rectangular wave, a triangular wave, or a sawtooth wave.

The amplitude of the waveform may be constant, or may change. From another viewpoint, a plurality of maximal values Va12 of the potential may be the same as each other or may differ from each other. A plurality of minimal values Va13 of the potential may be the same as each other or may differ from each other. In the illustrated example, the plurality of maximal values Va12 are the same as each other, and the plurality of minimal values Va13 are the same as each other.

When the plurality of maximal values Va12 are the same as each other and the plurality of minimal values Va13 are the same as each other as in the illustrated example, it is considered that the liquid L3 seemingly vibrates within a constant range and does not move toward the finish position P2. In the description of the mixing signal SgA5, the movement of the liquid L3 has been described so. However, in practice, the liquid L3 moves toward the finish position P2 due to the vibrational movement signal SgA42.

One of the reasons for this is, for example, that the inner surface of the first hole 10a includes a tapered surface whose diameter decreases toward the first end 11. In this case, the flow path resistance when the liquid L3 flows toward the first end 11 is greater than the flow path resistance when the liquid L3 flows toward the second end 12. As a result, the movement amount of the liquid L3 toward the first end 11 is less than the movement amount of the liquid L3 toward the second end 12. As a result, the liquid L3 gradually moves to the finish position P2 while repeating vibration.

Instead of or in addition to the reason described above, for example, there is a reason that the second hole 10b has a smaller diameter and higher hydrophilicity than the first hole 10a. In this case, for example, when the liquid L3 reaches the second hole 10b, a capillary force that causes the liquid L3 to flow from the first hole 10a to the second hole 10b acts on the liquid L3. As a result, the liquid L3 gradually moves to the finish position P2 while repeating vibration.

When the liquid L3 flows easily in the direction from the first hole 10a toward the second hole 10b as described above, if the minimal values Va13 are the same as each other, every time the potential reaches the minimal value Va13, the position of the liquid L3 becomes closer to the finish position P2 than that at the time of the immediately preceding minimal value Va13. In other words, when each of the second and later decreases of the volume, among repeated decreases of the volume of the pressure chamber 21, is finished, the liquid L3 is located closer to the finish position P2 than the position of the liquid L3 at the time when the immediately preceding decrease in the volume is finished. The above description about the minimal value Va13 also applies to the maximal value Va12. That is, each time the second and later increase in the volume, among repeated increases of the volume of the pressure chamber 21, is finished, the liquid L3 is located closer to the finish position P2 than the position of the liquid L3 at the time when the immediately preceding increase in the volume is finished.

However, for example, movements of the liquid L3 while the liquid L3 vibrates may include an exceptional movement such that the position of the liquid L3 at the time when decrease in the volume of the pressure chamber 21 is finished is the same as the position of the liquid L3 at the time when immediately preceding decrease in the volume is finished or is closer to the first end 11 than the position. Such an exceptional movement contributes to, for example, acceleration of mixing of the liquid L3. When movement of the liquid L3 toward the finish position P2 progresses to a certain degree, the easiness of flow of the liquid L3 in a direction from the first hole 10a to the second hole 10b becomes equivalent to easiness of flow of the liquid L3 in the opposite direction. Due to this, the position of the liquid L3 at the time when decrease in the potential is finished may be the same as the position of the liquid L3 at the time when immediately preceding decrease in the potential is finished.

The first variation in the potential of the vibrational movement signal SgA42 may be, for example, increase in the potential (illustrated example) or may be decrease in the potential. In the former case, for example, it is possible to make time for moving the liquid L3 to the finish position P2 shorter than that in the latter case. The last variation in the potential of the vibrational movement signal SgA42 may be, for example, increase in the potential (illustrated example) or may be decrease in potential. In the latter case, for example, it is possible to cause a braking force to act on the liquid L3 and to reduce the probability of movement of the liquid L3 across the finish position P2 due to an inertial force and the like.

The amplitude of the potential of the vibrational movement signal SgA42 may be set in any appropriate manner. In the illustrated example, the amplitude of the vibrational movement signal SgA42 is smaller than the amplitude of the mixing signal SgA5. Accordingly, for example, the velocity of the liquid when the liquid moves due to the vibrational movement signal SgA42 can be more easily suppressed than the velocity of the liquid when the liquid moves due to the mixing signal SgA5. In the illustrated example, the amount of increase in the vibrational movement signal SgA42 from the minimal value Va13 to the maximal value Va12 (in other words, twice the amplitude or the wave height) is less than the amount of increase in the potential of the initial movement signal SgA41.

The maximal value Va12 and the minimal value Va13 of the vibrational movement signal SgA42 each may be set in any appropriate manner. In the illustrated example, the maximal value Va12 is less than Va11, which is the maximum potential of the initial movement signal SgA41. In the illustrated example, the maximal value Va12 is approximately the same as the maximal value Va5 of the mixing signal SgA5 (for example, the difference between these two is less than the difference between the maximal value Va12 and the potential Va11), and the former is slightly greater than the latter. In the illustrated example, the minimal value Va13 is greater than the minimal value Va6 of the mixing signal SgA5.

In the illustrated example, the minimal value Va13 of the vibrational movement signal SgA42 is greater than the potential of the vibrational movement signal SgA42 at the time when the vibrational movement signal SgA42 started the initial increase (in the illustrated example, the potential Va0 at time t21, from another viewpoint, a potential at the time when the vibrational movement signal SgA42 is started to be output, and/or the reference potential). In other words, the volume of the pressure chamber 21 at the time when each of the repeated decreases of the volume of the pressure chamber 21 is finished is greater than the volume of the pressure chamber 21 at the time when the initial increase, among the repeated increases of the volume of the pressure chamber 21, is started. Moreover, because the plurality of maximal values Va12 are the same as each other, from another viewpoint, among the repeated increases of the volume of the pressure chamber 21, the amount of increase in the volume in each of the second and later increases is less than the amount of the first increase in the volume. Thus, for example, as described below, the probability of increase in the velocity of the liquid L3 in each of the second and later increases is reduced.

In the vibrational movement signal SgA42 of the illustrated example, at the last of the repetitions of increase and decrease in the potential, the potential decreases to a potential Va14 that is lower than the minimal value Va13. Thus, for example, it is possible to cause a braking force against an inertial force and/or a capillary force acting on the liquid L3 to act on the liquid L3. As a result, the accuracy in the stopping position of the liquid L3 increases.

The length of the period of increase and decrease in the potential of the vibrational movement signal SgA42 (for example, a period T2 from a minimal value Va13 to the next minimal value Va13) may be set in any appropriate manner. For example, the period T2 may be shorter than, equivalent to, or longer than the period (without a reference sign) of the mixing signal SgA5. Here, "equivalent" means a state in which, for example, the difference between the two is less than or equal to 20% or less than or equal to 10% of the shorter one. The period T2 may be, for example, longer than or equal to 0.1 seconds or longer than or equal to 0.5 seconds, and shorter than or equal to 10 seconds, shorter than or equal to 5 seconds, or shorter than or equal to 2 seconds; and, these lower limits and upper limits may be used in any appropriate combination.

Here, the values of various parameters of the initial movement signal SgA41 will be described. The waveform of the initial movement signal SgA41 may be pulse-like or impulse-like as described above. That is, the waveform of the initial movement signal SgA41 may be a waveform such that the potential sharply changes. Whether or not the potential sharply changes may be determined, for example, by comparison with the vibrational movement signal SgA42.

For example, the period T1 is shorter than the period T2 of the vibrational movement signal SgA42. To be more specific, the period T1 may be shorter than or equal to 1/2, shorter than or equal to 1/5, shorter than or equal to 1/10, or shorter than or equal to 1/20 of the period T2. The period T1 may be, for example, shorter than or equal to 0.1 seconds.

The amount of increase (Va11−Va0) in the potential of the initial movement signal SgA41 is, for example, greater than the amount of single-time increase in the potential of the vibrational movement signal SgA42 (the first increase (Va12−Va0) and/or each of the second and later increases (Va12−Va13)). However, when, for example, the distance between the initial position P0 and the mid-position P1 is comparatively short, unlike the illustrated example, the former may be less than or equivalent to the latter.

The amount of increase (Va11−Va0) in the potential of the initial movement signal SgA41 divided by the period T1 ((Va11−Va0)/T1) is, for example, greater than the amount of single-time increase in the potential of the vibrational movement signal SgA42 divided by the period T2 ((Va12−Va13)/T2). The latter may be (Va12−Va13) divided by the period from time t21 to the first minimal value Va13. From another viewpoint, the amount of increase in the volume of the pressure chamber 21 due to the initial movement signal SgA41 divided by the period T1 from the start of increase to the finish of decrease in the pressure chamber 21 due to the initial movement signal SgA41 is greater than the amount of single-time increase in the volume of the pressure chamber 21 due to the vibrational movement signal SgA42 divided by the period (for example, the period T2) from the start of the single-time increase to the finish of the next single-time decrease.

As described above, in the present embodiment, the pipette 1 includes the capillary 10, the pressure chamber 21, the drive unit 50, and the control unit 24. The first end 11 and the second end 12, which are the two ends of the capillary 10 in the length direction, are open. The pressure chamber 21 communicates with the inside of the capillary 10 via the second end 12. The drive unit 50 changes the volume of the pressure chamber 21. The control unit 24 controls the drive unit 50. The control unit 24 outputs a first movement signal (the vibrational movement signal SgA42) that drives the drive unit 50 so that the liquid L3 moves from a first position (the mid-position P1) in the capillary 10 to a second position (the finish position P2) that is located closer to the second end 12 than the mid-position P1. The vibrational movement signal SgA42 has a waveform that drives the drive unit 50 so that the volume of the pressure chamber 21 alternately repeats increase and decrease.

Accordingly, for example, it becomes easy to reduce the velocity of the liquid L3 when drawing up the liquid L3 to the finish position P2. The specifics are, for example, as follows.

Basically, increase in the volume of the pressure chamber 21 and movement amount of the liquid L3 to the finish position P2 are correlated with each other. Accordingly, it is possible to reduce the velocity of the liquid L3 by reducing the rate of change in increase in the volume of the pressure chamber 21. However, if a capillary force that pulls the liquid L3 in a direction from the first hole 10a toward the second hole 10b acts on the liquid L3, there is a case where it is not possible to sufficiently reduce the velocity of the liquid L3 by reducing the rate of change in increase in the volume of the pressure chamber 21. In such a case, it is possible to reduce the velocity of the liquid L3 by reducing the volume of the pressure chamber 21 to cause a braking force to act on the liquid L3. For example, it is also possible to make the velocity of the liquid L3 lower than the velocity of the liquid L3 at the time when the liquid L3 flows only due to a capillary force.

In the above description, a configuration with which the velocity of the liquid L3 increases due to a capillary force is described as an example. However, even for a configuration in which the capillary force is not generated, the effect of making it easy to reduce the velocity can be produced. For example, there is a time lag between the time when increase in the volume of the pressure chamber 21 starts and the time when a negative pressure, which is generated in accordance with the increase, acts on the liquid L3. If the volume of the pressure chamber 21 has decreased before the volume of the pressure chamber 21 increases as in the present embodiment, the time lag is long because the pressure chamber 21 has a positive pressure. As a result, in the case where increase and decrease in the volume of the pressure chamber 21 is repeated, compared with a case where the volume of the pressure chamber 21 is continuously increased, it is possible to substantially reduce the velocity of the liquid L3 relative to the rate of change in increase in the volume of the pressure chamber 21.

In the above description, an effect of reducing the velocity of the liquid L3 has been focused on. However, instead of or in addition to the effect, another effect may be expected. For example, when the liquid L3 includes a plurality of liquids (for example, the first liquid L1 and the second liquid L2) as in the embodiment, mixing of the first liquid L1 and second liquid L2 progresses due to the vibration of the liquid L3. Accordingly, for example, it is possible to move the liquid to a position suitable for measurement while mixing the liquid.

In the present embodiment, the vibrational movement signal SgA42 has a waveform that drives the drive unit 50 so that the liquid L3 is located closer to the finish position P2 than the mid-position P1 when the last decrease of the repeated decreases of the volume of the pressure chamber 21 is finished.

In this case, for example, because the liquid L3 has moved closer to the finish position P2 than the initial position (the mid-position P1) when the last increase in the volume of the pressure chamber 21 is finished, it is clear that the liquid L3 is moved from the mid-position P1 to the finish position P2 while being vibrated. In other words, it is possible to clearly distinguish between the vibrational movement signal SgA42 and the mixing signal SgA5 depending on whether or not the signal has such a waveform.

In the present embodiment, the vibrational movement signal SgA42 has a waveform that drives the drive unit 50 so that the liquid L3 is located closer to the finish position P2 than the position of the liquid L3 at the time when the immediately preceding decrease is finished, when each of the second and later decreases of repeated decreases of the volume of the pressure chamber 21 is finished.

In this case, for example, the liquid L3 moves to the finish position P2 every time the volume of the pressure chamber 21 decreases, and an exceptional movement of the liquid L3 is not performed. Accordingly, the probability of the velocity of the liquid L3 becoming high due to an exceptional movement is reduced. For example, the probability of the velocity of the liquid L3 becoming temporarily high due to increase in single-time decrease amount (and/or increase amount) of the volume is reduced.

In the present embodiment, the inner surface of the capillary 10 has, in at least a part of the range from the mid-position P1 to the finish position P2, a tapered surface (the inner surface of the first hole 10a) along which the inside diameter of the capillary 10 decreases toward the mid-position P1.

In this case, for example, as described above, the amount of movement of the liquid L3 toward the mid-position P1 becomes smaller than the amount of movement of the liquid L3 toward the finish position P2. Accordingly, for example, it is possible to move the liquid L3 toward the finish position P2 even if the plurality of minimal values Va13 are the same as each other. Accordingly, for example, it is easy to set the waveform of the vibrational movement signal SgA42. From another viewpoint, it is possible to determine the velocity of the liquid L3 by using settings of the tapered surface.

In the present embodiment, the waveform of the vibrational movement signal SgA42 is formed of a curve. For example, the waveform is a sine wave.

In this case, for example, the time for which the volume of the pressure chamber 21 maintains a maximal value is reduced compared with a configuration in which the waveform of the vibrational movement signal SgA42 is a rectangular wave having an amplitude and a period that are the same as those of a sine wave (this configuration is also included in the present disclosure). As a result, it becomes easy to reduce the velocity of the liquid L3.

In the present embodiment, the vibrational movement signal SgA42 has a waveform that drives the drive unit 50 so that the amount of increase in the volume in each of the second and later increases of repeated increases of the volume of the pressure chamber 21 (from another viewpoint, the amount of increase in the potential from the minimal value Va13 to the maximal value Va12) is less than the amount of the first increase in the volume (the amount of increase in the potential from the potential Va0 at time t21 to the first maximal value Va12).

In this case, for example, the probability of the liquid-drawing-up velocity becoming high in each of the second and later increases is reduced. The specifics are, for example, as follows. At the time when the first increase in the volume is started, the pressure of a gas that is closer to the first end 11 than the liquid L3 is equivalent the pressure of the outside of the pipette 1. On the other hand, at the time when each of the second and later increases of the volume is started, the gas that is closer to the first end 11 than the liquid L3 is compressed due to the immediately preceding decrease in the volume. This is due to resistance when the gas is discharged from the first end 11. Accordingly, in each of the second and later increases of the volume, the liquid-drawing-up velocity is likely to become high. Thus, it is possible to suppress increase in the velocity by reducing the amount of each of the second and later increases of the volume.

In the present embodiment, the control unit 24 outputs, before outputting the vibrational movement signal SgA42, a second movement signal (the initial movement signal SgA41) that drives the drive unit 50 so that the liquid L3 moves to the mid-position P1 from a third position (the initial position P0) that is closer to the first end 11 than the mid-position P1. The initial movement signal SgA41 has a waveform that drives the drive unit 50 so that the volume of the pressure chamber 21 increases and then decreases. The amount of increase in the volume of the pressure chamber 21 due to the initial movement signal SgA41 divided by the period T1 from the start of increase to the finish of decrease in the pressure chamber 21 due to the initial movement signal SgA41 (from another viewpoint, (Va11−Va0)/T1) is greater than the amount of increase in the volume of the pressure chamber 21 due to single-time increase due to the vibrational movement signal SgA42 divided by the period T2 from the start of the single-time increase to the finish of the next single-time decrease (from another viewpoint, (Va12−Va13)/T2).

In this case, for example, it is possible to rapidly move the liquid L3 due to the initial movement signal SgA41 from the initial position P0 to the mid-position P1 (to the position where movement of the liquid L3 is started due to the vibrational movement signal SgA42). As a result, it is possible to reduce the time required for the entire movement from the initial position P0 to the finish position P2, while moving the liquid L3 at a low velocity from the mid-position P1 to the finish position P2. Moreover, because the initial movement signal SgA41 has a waveform that can cause a braking force to act on the liquid L3 due to decrease in the volume of the pressure chamber 21, the probability of movement of the liquid L3 beyond the mid-position P1 due to a rapid movement due to the initial movement signal SgA41 is reduced.

In the present embodiment, the inner surface of the capillary 10 has the step 10c between the mid-position P1 and the finish position P2.

In this case, the liquid L3 moves at a low velocity due to the vibrational movement signal SgA42, and moves over the step 10c. As a result, for example, the probability of separation of the liquid L3 is reduced. The specifics are as follows.

Figure 7A:
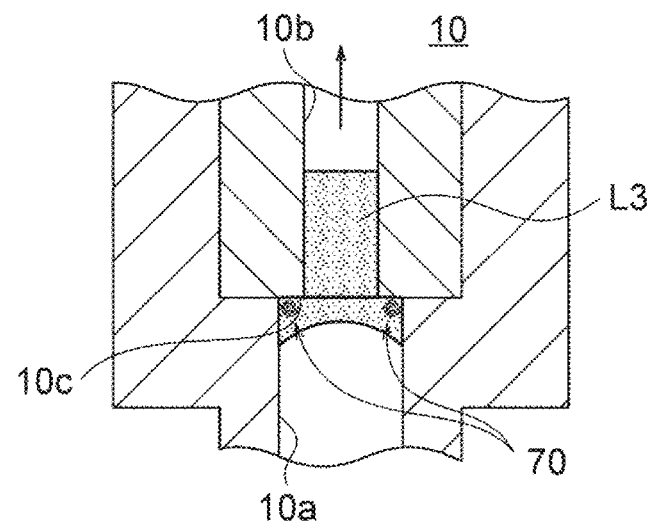
FIGS. 7A to 7C illustrate an example of the effect of the pipette of FIG. 1.
Figure 7B:
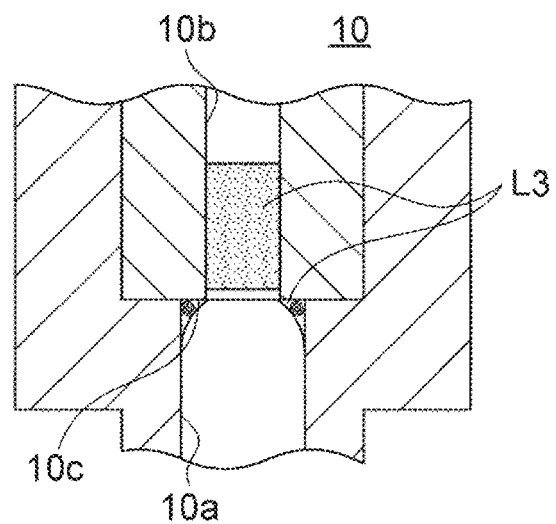
Figure 7C:
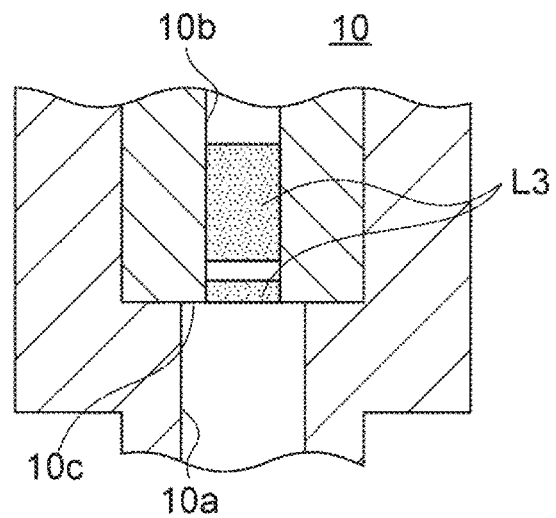

FIGS. 7A to 7C are sectional views illustrating how the liquid L3 becomes separated and each corresponding to a part of FIG. 2.

FIG. 7A illustrates a state in which the liquid L3 flows from the first hole 10a to the second hole 10b beyond the step 10c. At this time, if the velocity of the liquid L3 is high, a swirl 70 is likely to be generated before the step 10c. The swirl 70 is likely to prevent flow of the liquid L3 from the first hole 10a to the second hole 10b. As a result, as illustrated in FIG. 7B, in a state in which a part of the liquid L3 remains before the step 10c, the other part of the liquid L3 becomes separated upward from the step 10c. Subsequently, as illustrated in FIG. 7C, when the part of the liquid L3 remaining before the step 10c flows into the second hole 10b, the liquid L3 is separated in the second hole 10b. If the liquid L3 becomes separated in this way, for example, a bubble is present in the liquid L3, and therefore the accuracy in measurement is reduced when the components and/or the properties of the liquid L3 are measured by irradiating the liquid L3 with light.

On the other hand, in the present embodiment, the liquid L3 moves over the step 10c at a comparatively low velocity due to the vibrational movement signal SgA42. Accordingly, the size and/or the intensity of the swirl 70 is reduced. Thus, the liquid L3 is not likely to remain at the step 10c. As a result, the probability of separation of the liquid L3 is reduced.

It may be possible to prevent the liquid L3 from becoming separated at the step 10c by omitting the step 10c. However, the step 10c also produces an effect of mixing the liquid L3 by generating the swirl 70. Accordingly, by reducing the velocity of the liquid L3 instead of omitting the step 10c, it is possible to adjust the size and/or the intensity of the swirl 70 and to obtain both of the effect of mixing the liquid L3 and the effect of reducing the probability of separation of the liquid L3.

[First Modification]

FIG. 8 illustrates a vibrational movement signal SgA45 according to a first modification and corresponds to FIG. 5.

As illustrated in this figure, the minimal value of the potential of the vibrational movement signal SgA45 may be the same as the potential at the time when the potential of the vibrational movement signal SgA45 starts the first increase (in the illustrated example, the potential Va0 at time t21, from another viewpoint, the potential at the time when the vibrational movement signal SgA45 is started to be output, and/or the reference potential). In other words, the volume of the pressure chamber 21 at the time when each of the repeated decreases of the volume of the pressure chamber 21 is finished may be equivalent to the volume of the pressure chamber 21 at the time when the first increase, among the repeated increases of the volume of the pressure chamber 21, is started. Because a plurality of maximal values Va12 are the same as each other, from another viewpoint, among the repeated increases of the volume of the pressure chamber 21, the amount of increase in the volume in each of the second and later increases may be equivalent to the amount of the first increase in the volume.

Also with such a configuration, for example, it is possible to move the liquid L3 at a low velocity, compared with a case where the liquid L3 is moved from the mid-position P1 to the finish position P2 due to a pulse wave such as the initial movement signal SgA41.

The control unit 24 may, after outputting the vibrational movement signal SgA45, instead of automatically outputting the mixing signal SgA5, wait for a user's operation on an operation unit (for example, a switch group) of the pipette body 20. The control unit 24 may, in response to a predetermined operation, output a supplementary signal SgA6, which is illustrated on the right side (a side after an elapse of time t) of a line Ln1 in FIG. 8. The control unit 24 may output the mixing signal SgA5 in response to a predetermined operation, instead of outputting the supplementary signal SgA6 or after finished outputting the supplementary signal SgA6. The supplementary signal SgA6 is a signal for correcting the position of the liquid L3 if the liquid L3 is not located at a desirable position (here, the finish position P2) due to the vibrational movement signal SgA45. The waveform of the supplementary signal SgA6 may be set in any appropriate manner. The supplementary signal SgA6 may be incorporated in the embodiment and modifications described below.

[Second Modification]

FIG. 9 illustrates a vibrational movement signal SgA47 according to a second modification and corresponds to a part of FIG. 5.

As illustrated in this figure, the maximal value Va12 and the minimal value Va13 of the vibrational movement signal SgA47 may gradually increase. In other words, the volume of the pressure chamber 21 when each of the repeated increases of the volume of the pressure chamber 21 is finished may gradually increase. The volume of the pressure chamber 21 when each of the repeated decreases of the volume of the pressure chamber 21 is finished may gradually increase.

In the embodiment, the reason that the liquid L3 moves in a direction from the first end 11 toward the second end 12 even when the plurality of maximal values Va12 are the same as each other and the plurality of minimal values Va13 are parallel to each other has been described as an example.

However, even without such a reason, it is possible to move the liquid L3 in the direction from the first end 11 toward the second end 12 due to the vibrational movement signal SgA47. That is, in the present disclosure, the capillary 10 need not have a tapered surface and need not have a part where a capillary force becomes stronger toward the second end 12.

In the embodiment described above, the mid-position P1 is an example of a first position. The finish position P2 is an example of a second position. The vibrational movement signal SgA42 is an example of a first movement signal. The initial position P0 is an example of a third position. The initial movement signal SgA41 is an example of a second movement signal.

The technology according to the present disclosure is not limited to the embodiment and the modifications described above and may be carried out in various configurations.

The pipette is not limited to a pipette that is capable of mixing two liquids. For example, the pipette may suck one liquid to draw up the one liquid to an appropriate position. From another viewpoint, the first driving signal SgA need not include the second suction signal SgA2. Conversely, the pipette may be a pipette that can mix three or more liquids.

As describe above, the first driving signal SgA need not include the initial movement signal SgA41. The first driving signal SgA need not include the mixing signal SgA5 either. The first driving signal SgA that does not include the mixing signal SgA5 may be applied to, for example, a pipette for which mixing of liquids is not expected. The first driving signal SgA that does not include the mixing signal SgA5 may be applied to, for example, a pipette for which mixing of liquids is expected. This is because the vibrational movement signal SgA42 is capable of producing a mixing effect.

The pipette may be a pipette that does not have the valve 23. When the pipette has the valve 23, the timings of opening and closing the valve 23 may differ from those in the embodiment.

The invention claimed is:

1. A pipette, comprising:
a capillary having, in a length direction, a first end and a second end that are open;
a pressure chamber that communicates with an inside of the capillary via the second end;
a drive unit configured to change a volume of the pressure chamber; and
a control unit configured to control the drive unit,
wherein the control unit is configured to output a first movement signal that drives the drive unit so that a liquid moves from a predetermined first position in the capillary to a second position that is located closer to the second end than the first position,
wherein the first movement signal has a waveform that drives the drive unit so that the volume of the pressure chamber alternately increases and decreases repeatedly to gradually move the liquid toward the second position while vibrating the liquid so as to alternately repeat a movement toward the second position and a movement toward the first position, and
an amount of increase in the volume in each of a second and later increases of repeated increases and decreases of the volume of the pressure chamber is less than an amount of increase in a first increase in the volume.

2. The pipette according to claim 1,
wherein the first movement signal has the waveform that drives the drive unit so that the volume of the pressure chamber alternately increases and decreases repeatedly to gradually move the liquid toward the second position while vibrating the liquid so as to alternately repeat the movement toward the second position and the movement toward the first position, and
the liquid is located closer to the second position than the first position when a last decrease of repeated increases and decreases of the volume of the pressure chamber is finished.

3. The pipette according to claim 1,
wherein the first movement signal has the waveform that drives the drive unit so that, the volume of the pressure chamber alternately increases and decreases repeatedly to gradually move the liquid toward the second position while vibrating the liquid so as to alternately repeat the movement toward the second position and the movement toward the first position, and
when each of a second and later decreases of the repeated increases and decreases of the volume of the pressure chamber is finished, the liquid is located closer to the second position than a position of the liquid at a time when an immediately preceding decrease is finished.

4. The pipette according to claim 1,
wherein an inner surface of the capillary has, in at least a part of a range from the first position to the second position, a tapered surface along which an inside diameter of the capillary decreases toward the first position.

5. The pipette according to claim 1,
wherein the waveform of the first movement signal is formed of a curve.

6. The pipette according to claim 1,
wherein the control unit is configured to, before outputting the first movement signal, output a second movement signal that drives the drive unit so that the liquid moves to the first position from a third position that is closer to the first end than the first position,
wherein the second movement signal has a waveform that drives the drive unit so that the volume of the pressure chamber increases and then decreases, and
wherein an amount of increase in the volume of the pressure chamber due to the second movement signal divided by a period from a start of increase in the volume of the pressure chamber due to the second movement signal to a finish of decrease in the volume due to the second movement signal is greater than an amount of increase in the volume of the pressure chamber due to single-time increase due to the first movement signal divided by a period from a start of the single-time increase due to the first movement signal to a finish of a next single-time decrease due to the first movement signal.

7. The pipette according to claim 1,
wherein an inner surface of the capillary has a step between the first position and the second position.

8. A pipette, comprising:
a capillary having, in a length direction, a first end and a second end that are open;
a pressure chamber that communicates with an inside of the capillary via the second end;
a drive unit configured to change a volume of the pressure chamber; and
a control unit configured to control the drive unit,
wherein the control unit is configured to output a first movement signal that drives the drive unit so that a liquid moves from a predetermined first position in the capillary to a second position that is located closer to the second end than the first position,
wherein the first movement signal has a waveform that drives the drive unit so that the volume of the pressure chamber alternately increases and decreases repeatedly to gradually move the liquid toward the second position while vibrating the liquid so as to alternately repeat a movement toward the second position and a movement toward the first position, wherein the control unit is configured to, before outputting the first movement signal, output a second movement signal that drives the drive unit so that the liquid moves to the first position from a third position that is closer to the first end than the first position, wherein the second movement signal has a waveform that drives the drive unit so that the volume of the pressure chamber increases and then decreases, and wherein an amount of increase in the volume of the pressure chamber due to the second movement signal divided by a period from a start of increase in the volume of the pressure chamber due to the second movement signal to a finish of decrease in the volume due to the second movement signal is greater than an amount of increase in the volume of the pressure chamber due to single-time increase due to the first movement signal divided by a period from a start of the single-time increase due to the first movement signal to a finish of a next single-time decrease due to the first movement signal.

* * * * *